United States Patent
Jiao et al.

(10) Patent No.: US 12,526,801 B2
(45) Date of Patent: Jan. 13, 2026

(54) METHOD FOR DETERMINING HYBRID AUTOMATIC REPEAT REQUEST-ACKNOWLEDGEMENT HARQ-ACK CODEBOOK AND APPARATUS

(71) Applicant: Huawei Technologies Co., Ltd., Shenzhen (CN)

(72) Inventors: Shurong Jiao, Shanghai (CN); Jun Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 18/345,539

(22) Filed: Jun. 30, 2023

(65) Prior Publication Data
US 2023/0345490 A1    Oct. 26, 2023

Related U.S. Application Data

(63) Continuation of application No. PCT/CN2020/142539, filed on Dec. 31, 2020.

(51) Int. Cl.
*H04W 72/20* (2023.01)
*H04L 1/1829* (2023.01)
*H04L 1/1867* (2023.01)
*H04W 72/0446* (2023.01)

(52) U.S. Cl.
CPC ........... *H04W 72/20* (2023.01); *H04L 1/1854* (2013.01); *H04L 1/1887* (2013.01); *H04W 72/0446* (2013.01)

(58) Field of Classification Search
CPC .......... H04W 72/20; H04W 72/0446; H04L 1/1854; H04L 1/1887; H04L 5/0053; H04L 5/0055

USPC ......................................................... 370/329
See application file for complete search history.

(56) References Cited

U.S. PATENT DOCUMENTS

| | | | |
|---|---|---|---|
| 2019/0149365 A1* | 5/2019 | Chatterjee | H04W 76/11 370/329 |
| 2020/0213044 A1 | 7/2020 | Peng et al. | |
| 2020/0358562 A1 | 11/2020 | Peng et al. | |
| 2021/0058949 A1* | 2/2021 | Kim | H04W 72/1268 |
| 2023/0140467 A1* | 5/2023 | Lin | H04L 1/1896 370/329 |

(Continued)

FOREIGN PATENT DOCUMENTS

| | | | |
|---|---|---|---|
| CN | 110972302 A | 4/2020 | |
| CN | 111181709 A | 5/2020 | |

(Continued)

OTHER PUBLICATIONS

Nokia, "On PDCCH Enhancements for NR URLLC", R1-1912511, Nov. 18-22, 2019 (From Applicant's IDS) (Year: 2019).*

(Continued)

*Primary Examiner* — Mang Hang Yeung
(74) *Attorney, Agent, or Firm* — Conley Rose, P.C.

(57) ABSTRACT

A method for determining an HARQ-ACK codebook includes that a terminal determines, based on a time domain offset of HARQ-ACK feedback information, a DCI format set corresponding to the time domain offset, and determines a time domain location information set based on the DCI format set to determine a quantity of information bits of the HARQ-ACK codebook based on the time domain location information set.

20 Claims, 6 Drawing Sheets

(56) References Cited

U.S. PATENT DOCUMENTS

2023/0300827 A1\* 9/2023 Ying ............... H04W 76/20
370/329
2024/0205911 A1\* 6/2024 Lei ................ H04W 72/1263

FOREIGN PATENT DOCUMENTS

| CN | 111800236 A | 10/2020 |
|---|---|---|
| KR | 20200107725 A | 9/2020 |
| WO | 2019223436 A1 | 11/2019 |
| WO | 2020204526 A1 | 10/2020 |

OTHER PUBLICATIONS

Nokia, Nokia Shanghai Bell:"On PDCCH Enhancements for NR URLLC",3GPP TSG RAN WG1#99, Reno, NV, USA, Nov. 18-22, 2019, R1-1912511, total 20 pages.

Nokia, Nokia Shanghai Bell:"On UCI Enhancements for NR URLLC",3GPP TSG RAN WG1 #99, Reno, USA, Nov. 18-22, 2019, R1-1912512, total 23 pages.

3GPP TS 38.212 V16.2.0, Jun. 2020, 3rd Generation Partnership Project; Technical Specification Group Radio Access Network; NR; Multiplexing and channel coding (Release 16), 151 pages.

3GPP TS 38.213 V16.2.0, Jun. 2020, 3rd Generation Partnership Project; Technical Specification Group Radio Access Network; NR; Physical layer procedures for control (Release 16), 176 pages.

3GPP TS 38.214 V16.2.0, Jun. 2020, 3rd Generation Partnership Project; Technical Specification Group Radio Access Network; NR; Physical layer procedures for data (Release 16), 163 pages.

3GPP TS 38.331 V16.2.0, Sep. 2020, 3rd Generation Partnership Project; Technical Specification Group Radio Access Network; NR; Radio Resource Control (RRC) protocol specification (Release 16), 921 pages.

R1-2005673, CATT, Remaining issues on UCI enhancements, 3GPP TSG RAN WG1 #102-e, e-Meeting, Aug. 17-28, 2020, 12 pages.

R1-2008821, ZTE , Discussion on HARQ-ACK enhancements for eURLLC, 3GPP TSG RAN WG1 Meeting #103-e, e-Meeting, Oct. 26-Nov. 13, 2020, 10 pages.

\* cited by examiner

METHOD FOR DETERMINING HYBRID AUTOMATIC REPEAT REQUEST-ACKNOWLEDGEMENT HARQ-ACK CODEBOOK AND APPARATUS

CROSS-REFERENCE TO RELATED APPLICATIONS

This is a continuation of International Patent Application No. PCT/CN2020/142539 filed on Dec. 31, 2020, the disclosure of which is hereby incorporated by reference in its entirety.

TECHNICAL FIELD

This application relates to the communication field, and in particular, to a method for determining a hybrid automatic repeat request-acknowledgement (HARQ-ACK) codebook and an apparatus.

BACKGROUND

In a new radio (NR) system, a network device can send a physical downlink shared channel (PDSCH) to a terminal. The PDSCH can carry downlink data sent by the network device to the terminal. Correspondingly, the terminal can send feedback information of the PDSCH to the network device through a physical uplink control channel (PUCCH). The feedback information may be carried in an HARQ-ACK codebook.

Further, the terminal can determine a quantity of information bits of the HARQ-ACK codebook based on a quantity of combinations of start and length value indicator values (SLIVs) and PDSCH-to-HARQ feedback timing, and then send the HARQ-ACK codebook to the network device through the PUCCH. The SLIV may indicate a time domain location of the PDSCH, and the PDSCH-to-HARQ feedback timing may indicate a time domain offset of the PUCCH relative to the PDSCH.

However, a redundant information bit may be caused by determining the quantity of information bits based on the quantity of combinations. This increases resource overheads and further reduces communication efficiency.

SUMMARY

Embodiments of this application provide a method for determining a hybrid automatic repeat request-acknowledgement codebook and an apparatus to reduce a redundant information bit, reduce resource overheads, and further improve communication efficiency.

To achieve the foregoing objective, this application uses the following technical solutions.

According to a first aspect, a method for determining a hybrid automatic repeat request-acknowledgement HARQ-ACK codebook is provided. The method includes receiving configuration information from a network device, where the configuration information indicates N downlink control information DCI formats, N time domain offset information sets, and N time domain location information sets, N is a positive integer, each of the N DCI formats corresponds to one of the N time domain offset information sets, each of the N DCI formats corresponds to one of the N time domain location information sets, time domain location information in the time domain location information set indicates a time domain location of a downlink data channel, time domain offset information in the time domain offset information set indicates a time domain offset of an uplink control channel relative to the downlink data channel, and the uplink control channel is used to carry feedback information of the downlink data channel; determining a quantity of information bits of an HARQ-ACK codebook based on a first time domain location information set corresponding to first time domain offset information; and further sending the HARQ-ACK codebook to the network device. The first time domain offset information is an element in a first time domain offset information set. The first time domain offset information set is a union set of the N time domain offset information sets. The first time domain location information set is determined based on a first DCI format set corresponding to the first time domain offset information. The HARQ-ACK codebook includes the feedback information of the downlink data channel.

According to the method in the first aspect, each of the N DCI formats may correspond to one of the N time domain offset information sets, and each of the N DCI formats may correspond to one of the N time domain location information sets. Therefore, a combination that has a correspondence and that is of the first time domain offset information and the first time domain location information set may be determined based on the N DCI formats from all combinations of the time domain offset information in the N time domain offset information sets and the time domain location information in the N time domain location information sets. Compared with the existing manner in which the quantity of information bits is determined based on all combinations of union sets of the N time domain offset information sets and union sets of the N time domain location information sets, in this manner in which the quantity of information bits is determined based on the combination that has the correspondence, a redundant information bit can be reduced, resource overheads can be reduced, and communication efficiency can be further improved.

In a possible design solution, the first DCI format set is determined based on the N DCI formats and the N time domain offset information sets corresponding to the N DCI formats. Any DCI format included in the first DCI format set may be one of the N DCI formats. The first DCI format set includes M DCI formats, and M is a positive integer less than or equal to N. The first time domain location information set is a union set of M time domain location information sets corresponding to the M DCI formats, and any one of the M time domain location information sets is one of the N time domain location information sets.

Optionally, a time domain offset information set corresponding to each DCI format in the first DCI format set includes the first time domain offset information. In other words, the first DCI format set is determined based on a correspondence between each of the N DCI formats and a corresponding time domain offset information set in the N time domain offset information sets. In this way, the first DCI format set can be quickly and accurately determined, to quickly and accurately determine the quantity of information bits of the HARQ-ACK codebook based on the correspondence of the first DCI format set such as to improve communication efficiency.

In a possible design solution, the determining a quantity of information bits of a hybrid automatic repeat request-acknowledgement HARQ-ACK codebook based on a first time domain location information set corresponding to first time domain offset information may include determining a quantity of candidate downlink data channel reception occasions corresponding to the first time domain location information set, and determining the quantity of information bits of the HARQ-ACK codebook based on the quantity of reception occasions.

In a possible design solution, the method in the first aspect may further include receiving DCI from the network device, and receiving the downlink data channel from the network device at a time domain location indicated by first time domain location information. The DCI may indicate the first time domain location information and the first time domain offset information, and the first time domain location information may be an element in the first time domain location information set.

Optionally, a location of the feedback information of the downlink data channel in an information bit sequence of the HARQ-ACK codebook may be determined based on the first time domain offset information and the first time domain location information.

Both a network side and a terminal side may determine, based on the first time domain offset information and the time domain location indicated by the first time domain location information, the location of the feedback information of the downlink data channel in the information bit sequence of the HARQ-ACK codebook. Therefore, after the terminal side sends the HARQ-ACK codebook to the network side based on the location of the feedback information, the network side can correctly parse the HARQ-ACK codebook based on the location of the feedback information.

According to a second aspect, a method for determining a hybrid automatic repeat request-acknowledgement HARQ-ACK codebook is provided. The method includes sending configuration information to a terminal, where the configuration information indicates that N downlink control information DCI formats, N time domain offset information sets, and N time domain location information sets, N is a positive integer, each of the N DCI formats corresponds to one of the N time domain offset information sets, each of the N DCI formats corresponds to one of the N time domain location information sets, time domain location information in the time domain location information set indicates a time domain location of a downlink data channel, time domain offset information in the time domain offset information set indicates a time domain offset of an uplink control channel relative to the downlink data channel, and the uplink control channel is used to carry feedback information of the downlink data channel; determining a quantity of information bits of an HARQ-ACK codebook based on a first time domain location information set corresponding to first time domain offset information; and further receiving the HARQ-ACK codebook from the terminal. The first time domain offset information is an element in a first time domain offset information set, the first time domain offset information set is a union set of the N time domain offset information sets, and the first time domain location information set is determined based on a first DCI format set corresponding to the first time domain offset information. The HARQ-ACK codebook includes the feedback information of the downlink data channel.

In a possible design solution, the first DCI format set may be determined based on the N DCI formats and the N time domain offset information sets corresponding to the N DCI formats. Any DCI format included in the first DCI format set may be one of the N DCI formats. The first DCI format set may include M DCI formats, and M is a positive integer less than or equal to N. The first time domain location information set may be a union set of M time domain location information sets corresponding to the M DCI formats. Any one of the M time domain location information sets may be one of the N time domain location information sets.

Optionally, a time domain offset information set corresponding to each DCI format in the first DCI format set may include the first time domain offset information.

In a possible design solution, the determining a quantity of information bits of a hybrid automatic repeat request-acknowledgement HARQ-ACK codebook based on a first time domain location information set corresponding to first time domain offset information may include determining a quantity of candidate downlink data channel reception occasions corresponding to the first time domain location information set, and determining the quantity of information bits of the HARQ-ACK codebook based on the quantity of reception occasions.

In a possible design solution, the method in the second aspect may further include sending DCI to the terminal, and sending the downlink data channel to the terminal at a time domain location indicated by first time domain location information. The DCI may indicate the first time domain location information and the first time domain offset information, and the first time domain location information may be an element in the first time domain location information set.

Optionally, a location of the feedback information of the downlink data channel in an information bit sequence of the HARQ-ACK codebook may be determined based on the first time domain offset information and the time domain location corresponding to the first time domain location information.

In addition, for technical effect of the method in the second aspect, refer to the technical effect of the method in the first aspect. Details are not described herein again.

According to a third aspect, a communication apparatus is provided. The apparatus includes a transceiver module and a processing module. The transceiver module is configured to receive configuration information from a network device. The configuration information indicates that N downlink control information DCI formats, N time domain offset information sets, and N time domain location information sets, N is a positive integer, each of the N DCI formats corresponds to one of the N time domain offset information sets, each of the N DCI formats corresponds to one of the N time domain location information sets, time domain location information in the time domain location information set indicates a time domain location of a downlink data channel, time domain offset information in the time domain offset information set indicates a time domain offset of an uplink control channel relative to the downlink data channel, and the uplink control channel is used to carry feedback information of the downlink data channel. The processing module is configured to determine a quantity of information bits of an HARQ-ACK codebook based on a first time domain location information set corresponding to first time domain offset information; and the transceiver module sends the HARQ-ACK codebook to the network device. The first time domain offset information may be an element in a first time domain offset information set. The first time domain offset information set may be a union set of the N time domain offset information sets. The first time domain location information set may be determined based on a first DCI format set corresponding to the first time domain offset information. The HARQ-ACK codebook includes the feedback information of the downlink data channel.

In a possible design solution, the first DCI format set may be determined based on the N DCI formats and the N time domain offset information sets corresponding to the N DCI formats. Any DCI format included in the first DCI format set may be one of the N DCI formats. The first DCI format set may include M DCI formats, and M is a positive integer less than or equal to N. The first time domain location information set may be a union set of M time domain location information sets corresponding to the M DCI formats, and any one of the M time domain location information sets may be one of the N time domain location information sets.

Optionally, a time domain offset information set corresponding to each DCI format in the first DCI format set may include the first time domain offset information.

In a possible design solution, the processing module may be further configured to determine a quantity of candidate downlink data channel reception occasions corresponding to the first time domain location information set, and determine the quantity of information bits of the HARQ-ACK codebook based on the quantity of reception occasions.

In a possible design solution, the transceiver module may be further configured to receive DCI from the network device, and receive the downlink data channel from the network device at a time domain location indicated by first time domain location information. The DCI indicates the first time domain location information and the first time domain offset information. The first time domain location information may be an element in the first time domain location information set.

Optionally, a location of the feedback information of the downlink data channel in an information bit sequence of the HARQ-ACK codebook may be determined based on the first time domain offset information and the first time domain location information.

Optionally, the transceiver module may include a receiving module and a sending module. The receiving module is configured to implement a receiving function of the apparatus in the third aspect, and the sending module is configured to implement a sending function of the apparatus.

Optionally, the apparatus in the third aspect may further include a storage module, and the storage module stores a program or instructions. When the processing module executes the program or the instructions, the apparatus can perform the method in the first aspect.

According to a fourth aspect, a communication apparatus is provided. The apparatus includes a transceiver module and a processing module. The transceiver module is configured to send configuration information to a terminal. The configuration information indicates that N downlink control information DCI formats, N time domain offset information sets, and N time domain location information sets, N is a positive integer, each of the N DCI formats corresponds to one of the N time domain offset information sets, each of the N DCI formats corresponds to one of the N time domain location information sets, time domain location information in the time domain location information set indicates a time domain location of a downlink data channel, time domain offset information in the time domain offset information set indicates a time domain offset of an uplink control channel relative to the downlink data channel, and the uplink control channel is used to carry feedback information of the downlink data channel. The processing module is configured to determine a quantity of information bits of an HARQ-ACK codebook based on a first time domain location information set corresponding to first time domain offset information. The first time domain offset information is an element in a first time domain offset information set, the first time domain offset information set is a union set of the N time domain offset information sets, and the first time domain location information set is determined based on a first DCI format set corresponding to the first time domain offset information. The transceiver module is further configured to receive the HARQ-ACK codebook from the terminal. The HARQ-ACK codebook includes the feedback information of the downlink data channel.

In a possible design solution, the first DCI format set may be determined based on the N DCI formats and the N time domain offset information sets corresponding to the N DCI formats. Any DCI format included in the first DCI format set may be one of the N DCI formats. The first DCI format set may include M DCI formats, and M is a positive integer less than or equal to N. The first time domain location information set may be a union set of M time domain location information sets corresponding to the M DCI formats. Any one of the M time domain location information sets may be one of the N time domain location information sets.

Optionally, a time domain offset information set corresponding to each DCI format in the first DCI format set may include the first time domain offset information.

In a possible design solution, the processing module may be further configured to determine a quantity of candidate downlink data channel reception occasions corresponding to the first time domain location information set, and determine the quantity of information bits of the HARQ-ACK codebook based on the quantity of reception occasions.

In a possible design solution, the transceiver module may be further configured to: send DCI to the terminal, and send the downlink data channel to the terminal at a time domain location indicated by first time domain location information. The DCI may indicate the first time domain location information and the first time domain offset information, and the first time domain location information may be an element in the first time domain location information set.

Optionally, a location of the feedback information of the downlink data channel in an information bit sequence of the HARQ-ACK codebook may be determined based on the first time domain offset information and the time domain location corresponding to the first time domain location information.

Optionally, the transceiver module may include a receiving module and a sending module. The receiving module is configured to implement a receiving function of the apparatus in the fourth aspect, and the sending module is configured to implement a sending function of the apparatus.

Optionally, the apparatus in the fourth aspect may further include a storage module, and the storage module stores a program or instructions. When the processing module executes the program or the instructions, the apparatus can perform the method in the second aspect.

According to a fifth aspect, a communication apparatus is provided. The apparatus includes a processor, and the processor is coupled to a memory. The memory may be integrated into the communication apparatus, or may be coupled to the communication apparatus. The processor is configured to execute a computer program stored in the memory such that the apparatus performs the method in the first aspect or the method in the second aspect.

Optionally, the apparatus in the fifth aspect may further include a receiver and a transmitter. The receiver is configured to implement a receiving function of the apparatus, and the transmitter is configured to implement a sending function of the apparatus. Alternatively, the transmitter and the receiver may be integrated into one device, for example, a transceiver. The transceiver is configured to implement a sending function and a receiving function of the apparatus.

It should be noted that the apparatus in the fifth aspect may be a terminal or a network device, may be a chip (system) or another part or component that can be disposed on the terminal or the network device, or may be an apparatus that includes the terminal or the network device. This is not limited in this application.

According to a sixth aspect, a communication apparatus is provided. The apparatus includes a processor and a transceiver. The transceiver may be a transceiver circuit or an interface circuit. The transceiver is configured to exchange information between the apparatus and another apparatus. The processor executes program instructions, to perform the method in the first aspect or the method in the second aspect.

Optionally, the apparatus in the sixth aspect may further include a memory, and the memory stores a program or instructions. When the processor in the sixth aspect executes the program or the instructions, the apparatus can perform the method in the first aspect or the method in the second aspect.

It should be noted that the apparatuses in the third aspect to the sixth aspect each may be a terminal or a network device, may be a chip (system) or another part or component that can be disposed on the terminal or the network device, or may be an apparatus that includes the terminal or the network device. This is not limited in this application.

According to a seventh aspect, a computer-readable storage medium storing a computer program or instructions is provided. When the computer program or the instruction are executed by a communication apparatus, the communication apparatus is enabled to implement the method in the first aspect or the second aspect.

According to an eighth aspect, a computer program product is provided. The computer program product may include a computer program or instructions, and when the computer program or the instructions are executed by a communication apparatus, the communication apparatus is enabled to implement the method in the first aspect or the method in the second aspect.

According to a ninth aspect, a communication system is provided. The communication system may include one or more terminals and one or more network devices. The terminal can perform the method in the first aspect, and the network device can perform the method in the second aspect.

DESCRIPTION OF EMBODIMENTS

Technical terms in embodiments of this application are first described.

1. PDSCH

The PDSCH may be used to carry downlink data.

Further, a terminal such as user equipment (UE) may access one or more downlink serving cells of a network device such as a base station (BS). The network device may send a corresponding PDSCH to the terminal in the downlink serving cell, and the downlink data is carried on the PDSCH such that the terminal obtains the downlink data.

(2) SLIV

The SLIV may indicate a specific time domain location of a PDSCH in a slot. A network device may configure, by using higher layer signaling, for example, radio resource control (RRC) signaling, an SLIV set corresponding to a DCI format, or predefine the SLIV set corresponding to the DCI format in a protocol, to indicate a symbol in which the PDSCH may be located in one slot. For a specific implementation of the DCI format, refer to related descriptions in the following "6. HARQ-ACK codebook" and "S501".

Figure 1:
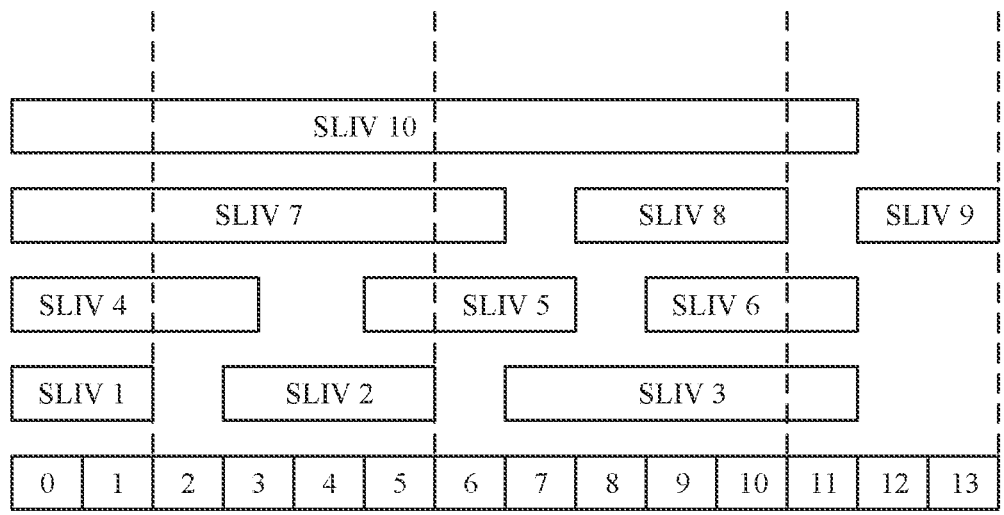
FIG. 1 is a schematic diagram 1 of a time domain location corresponding to a candidate PDSCH reception occasion according to an embodiment of this application.

For example, as shown in FIG. 1, one slot includes 14 symbols, an SLIV set may include an SLIV 1 to an SLIV 10, and time domain locations of PDSCHs indicated by the SLIV set may be specifically shown in Table 1.

TABLE 1

| SLIV No. | Indicated time domain location |
| --- | --- |
| SLIV 1 | The indicated time domain location starts from a symbol 0 and has a length of two symbols. |
| SLIV 2 | The indicated time domain location starts from a symbol 3 and has a length of three symbols. |
| SLIV 3 | The indicated time domain location starts from a symbol 7 and has a length of five symbols. |
| SLIV 4 | The indicated time domain location starts from a symbol 0 and has a length of four symbols. |
| SLIV 5 | The indicated time domain location starts from a symbol 5 and has a length of three symbols. |
| SLIV 6 | The indicated time domain location starts from a symbol 9 and has a length of three symbols. |
| SLIV 7 | The indicated time domain location starts from a symbol 0 and has a length of seven symbols. |
| SLIV 8 | The indicated time domain location starts from a symbol 8 and has a length of three symbols. |

TABLE 1-continued

| SLIV No. | Indicated time domain location |
|---|---|
| SLIV 9 | The indicated time domain location starts from a symbol 12 and has a length of two symbols. |
| SLIV 10 | The indicated time domain location starts from a symbol 0 and has a length of 12 symbols. |

3. Candidate PDSCH Reception Occasion

A quantity of candidate PDSCH reception occasions may indicate a maximum quantity of PDSCHs that do not overlap each other and that can be sent to a terminal by a network device in one slot. Correspondingly, the quantity of candidate PDSCH reception occasions may further indicate a maximum quantity of PDSCHs that do not overlap each other and that can be received by the terminal in one slot.

Optionally, a quantity of candidate PDSCH reception occasions in one slot may be determined based on a time domain location relationship corresponding to each SLIV in an SLIV set.

For ease of understanding, the following continues to use the SLIV set shown in FIG. 1 as an example for description.

First, in {SLIV 1 to SLIV 10}, because an end symbol of the SLIV 1 is the earliest and is a symbol 1, the network device may determine, on the symbol 1, four SLIVs (which all include the symbol 1) that overlap each other: {SLIV 1, SLIV 4, SLIV 7, SLIV 10}. In this way, {SLIV 1, SLIV 4, SLIV 7, SLIV 10} may correspond to a first candidate PDSCH reception occasion, to indicate that on the first candidate PDSCH reception occasion, the network device may select to send a PDSCH corresponding to any SLIV in {SLIV 1, SLIV 4, SLIV 7, SLIV 10}.

Second, in remaining SLIVs other than {SLIV 1, SLIV 4, SLIV 7, SLIV 10}, because an end symbol of an SLIV 2 is the earliest and is a symbol 5, the network device may determine, on the symbol 5, two SLIVs (which both include the symbol 5) that overlap each other: {SLIV 2, SLIV 5}. In this way, {SLIV 2, SLIV 5} may correspond to a second candidate PDSCH reception occasion, to indicate that on the second candidate PDSCH reception occasion, the network device may select to send a PDSCH corresponding to any SLIV in {SLIV 2, SLIV 5}.

Third, in remaining SLIVs other than {SLIV 1, SLIV 2, SLIV 4, SLIV 5, SLIV 7, SLIV 10}, because an end symbol of an SLIV 8 is the earliest and is a symbol 11, the network device may determine, on the symbol 11, three SLIVs (which all include the symbol 11) that overlap each other: {SLIV 3, SLIV 6, SLIV 8}. In this way, {SLIV 3, SLIV 6, SLIV 8} may correspond to a third candidate PDSCH reception occasion, to indicate that on the third candidate PDSCH reception occasion, the network device may select to send a PDSCH corresponding to any SLIV in {SLIV 3, SLIV 6, SLIV 8}.

Finally, a remaining SLIV 9 may correspond to a fourth candidate PDSCH reception occasion, to indicate that a PDSCH corresponding to the SLIV 9 may be sent on the fourth candidate PDSCH reception occasion.

A total of four candidate PDSCH reception occasions are determined in {SLIV 1 to SLIV 10}. It may indicate that the network device may send, in one slot, a maximum of four PDSCHs that do not overlap each other, for example, send PDSCHs respectively corresponding to {SLIV 1, SLIV 2, SLIV 3, SLIV 9}, send PDSCHs respectively corresponding to {SLIV 4, SLIV 5, SLIV 6, SLIV 9}, or send PDSCHs respectively corresponding to {SLIV 10, SLIV 9}. Correspondingly, it may further indicate that the terminal may receive, in one slot, a maximum of four PDSCHs that do not overlap each other.

Further, after determining a PDSCH that corresponds to one SLIV and that may be sent in one slot, the network device may determine a PDSCH that corresponds to which SLIV and that may be further sent in remaining candidate PDSCH reception occasions.

For example, refer to FIG. 1 and Table 1. PDSCHs that may be sent in one slot may be sequentially determined from front to back in a time domain order of candidate PDSCH reception occasions. Specifically, the following steps may be included:

Step 1: The network device determines to send a PDSCH (the first candidate PDSCH reception occasion) corresponding to the SLIV 1.

Step 2: If determining to send the PDSCH (the first candidate PDSCH reception occasion) corresponding to the SLIV 1, the network device may further send a PDSCH (the second candidate PDSCH reception occasion) corresponding to the SLIV 2 because the two PDSCHs do not overlap each other in time.

Step 3: If determining to send the PDSCH (the second candidate PDSCH reception occasion) corresponding to the SLIV 2, the network device may further send a PDSCH (the third candidate PDSCH reception occasion) corresponding to any SLIV in {SLIV 3, SLIV 6, SLIV 8}.

Step 4: Regardless of a PDSCH (the third candidate PDSCH reception occasion) corresponding to which SLIV in {SLIV 3, SLIV 6, SLIV 8} is determined to be sent in the step 3, the network device may further send a PDSCH (the fourth candidate PDSCH reception occasion) corresponding to the SLIV 9 because the two PDSCHs do not overlap each other in time.

That is, it may be determined in the step 1 to the step 4 that a total of four PDSCHs respectively corresponding to {SLIV 1, SLIV 2, SLIV 3, SLIV 9} may be sent in one slot.

Similarly, if it is determined in the step 2 that a PDSCH corresponding to the SLIV 5 is to be sent, it is determined in the step 3 that a PDSCH corresponding to any SLIV in {SLIV 6, SLIV 8} may be further sent and a PDSCH corresponding to the SLIV 3 may not be sent (because the SLIV 3 and the SLIV 5 overlap each other in time), and it is determined in the step 4 that the PDSCH corresponding to the SLIV 9 may be further sent, so as to obtain a total of four PDSCHs that respectively correspond to {SLIV 1, SLIV 5, SLIV 6, SLIV 9} and that may be sent in one slot.

If a first selected PDSCH overlaps a PDSCH in remaining candidate PDSCH reception occasions in time domain, the overlapping PDSCH cannot be selected to be sent, so as to avoid a resource conflict and interference. For example, if the network device selects to send a PDSCH corresponding to the SLIV 10 in the step 1, because the PDSCH corresponding to the SLIV 10 overlaps PDSCHs corresponding to all SLIVs in the second and third candidate PDSCH reception occasions in time domain, the network device cannot send a PDSCH corresponding to any SLIV in the second and third candidate PDSCH reception occasions. Because the PDSCH corresponding to the SLIV 10 does not overlap the PDSCH corresponding to the SLIV 9 in the fourth candidate PDSCH reception occasion in time domain, the network device may further send the PDSCH corresponding to the SLIV 9. That is, a total of two PDSCHs respectively corresponding to {SLIV 10, SLIV 9} may be sent in one slot.

4. PUCCH

The PUCCH may be used to carry feedback information of a PDSCH.

Specifically, a terminal may access one or more uplink serving cells of a network device. After receiving a PDSCH, the terminal may send a corresponding PUCCH in an uplink serving cell, and feedback information of the PDSCH is carried on the PUCCH. For complexity of sending of the terminal, a maximum of two uplink serving cells in a cell group may carry PUCCHs.

If downlink data carried on the PDSCH is correctly received, the feedback information of the PDSCH may be an acknowledgement (ACK). If no downlink data carried on the PDSCH is received, the feedback information of the PDSCH may be a negative acknowledgement (NACK).

That no downlink data carried on the PDSCH is received may be that: the PDSCH is not sent; or the PDSCH is sent, but the downlink data carried by the PDSCH is incorrectly received, for example, decoding of the downlink data fails.

5. PDSCH-to-HARQ Feedback Timing (Referred to as a K Value)

The K value may indicate a time domain offset of a PUCCH relative to a PDSCH, so that after receiving a PDSCH, a terminal may send HARQ feedback information of the PDSCH to a network device through a PUCCH at a time domain location indicated by the K value. A unit of the time domain offset may be a slot, a short slot, a sub-slot, a mini-slot, a frame, or a sub-frame. The following provides descriptions by using an example in which a unit of the time domain offset is a slot.

Figure 2:
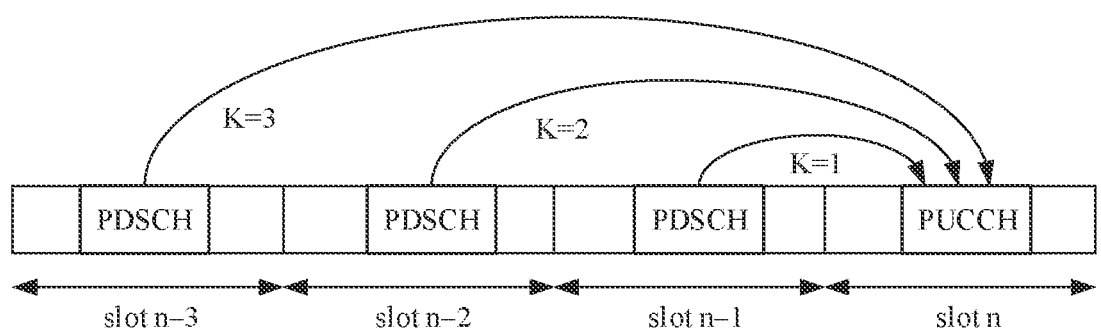
FIG. 2 is a schematic diagram 1 of time domain locations of a PUCCH and a PDSCH according to an embodiment of this application.

As shown in FIG. 2, a time domain location of a PUCCH is a slot n, and n is a positive integer. If K=1, it indicates that a time domain location of a PDSCH corresponding to the PUCCH is a slot n−1, in this case, a time domain offset between the PUCCH and the PDSCH is one slot. If K=2, it indicates that a time domain location of a PDSCH corresponding to the PUCCH is a slot n−2, in this case, a time domain offset between the PUCCH and the PDSCH is two slots. If K=3, it indicates that a time domain location of a PDSCH corresponding to the PUCCH is a slot n−3, in this case, a time domain offset between the PUCCH and the PDSCH is three slots. When a time domain offset set is {1, 2, 3}, feedback information of the PDSCH in the slot n−3, n−2, or n−1 may be carried on the PUCCH in the slot n.

Figure 3:
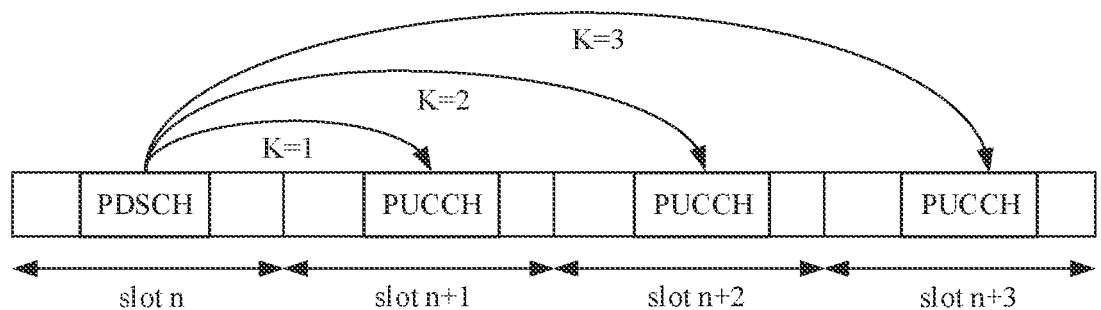
FIG. 3 is a schematic diagram 2 of time domain locations of a PUCCH and a PDSCH according to an embodiment of this application.

As shown in FIG. 3, a time domain location of a PDSCH is a slot n, and n is a positive integer. If K=1, it indicates that a time domain location of a PUCCH corresponding to the PDSCH may be a slot n+1, in this case, a time domain offset between the PDSCH and the PUCCH is one slot. If K=2, it indicates that a time domain location of a PUCCH corresponding to the PDSCH may be a slot n+2, in this case, a time domain offset between the PDSCH and the PUCCH is two slots. If K=3, it indicates that a time domain location of a PUCCH corresponding to the PDSCH may be a slot n+3, in this case, a time domain offset between the PDSCH and the PUCCH is three slots. When a time domain offset set is {1, 2, 3}, feedback information of the PDSCH in the slot n may be sent on the PUCCH in any one of the slot n+1, n+2, or n+3.

The network device may configure, by using higher layer signaling, for example, RRC signaling, a K value set corresponding to a DCI format, or predefine the K value set corresponding to the DCI format in a protocol.

6. HARQ-ACK Codebook

The HARQ-ACK codebook may include corresponding HARQ feedback information of a plurality of PDSCHs.

In NR, because a downlink data volume of a terminal is usually greater than an uplink data volume of the terminal, a quantity of downlink serving cells supported by the terminal is usually greater than a quantity of uplink serving cells supported by the terminal. That is, one uplink serving cell may correspond to a plurality of downlink serving cells. Correspondingly, one HARQ-ACK codebook of the terminal may correspond to a plurality of PDSCHs. In this way, corresponding feedback information of the plurality of PDSCHs may be sent through one PUCCH or one physical uplink shared channel (PUSCH), that is, the HARQ-ACK codebook may be carried on one PUCCH or one PUSCH. Therefore, a network device can obtain the feedback information of the plurality of PDSCHs by receiving one PUCCH or one PUSCH, to effectively improve communication efficiency.

For example, the terminal can determine the HARQ-ACK codebook based on a downlink control information (DCI) format, a K value, and an SLIV.

The DCI format may correspond to a K value set and an SLIV set, to indicate that DCI in a corresponding format may be used to schedule a PDSCH based on a corresponding K value set and SLIV set, and different DCI formats may correspond to same or different K value sets and/or SLIV sets.

For example, if a K value set indicated by a DCI format 1_0 is {1, 2, 3, 4, 5, 6, 7, 8}, and an SLIV set indicated by the DCI format 1_0 is {SLIV 1, SLIV 2}, it indicates that when the network device uses DCI in the format 1_0 to schedule the PDSCH, a K value in {1, 2, 3, 4, 5, 6, 7, 8} and an SLIV in {SLIV 1, SLIV 2} may be used.

For another example, if a K value set indicated by a DCI format 1_1 is {1, 2, 3}, and an SLIV set indicated by the DCI format 1_1 is {SLIV 1 to SLIV 6}, it indicates that when the network device uses DCI in the format 1_1 to schedule the PDSCH, a K value in {1, 2, 3} and an SLIV in {SLIV 1 to SLIV 6} may be used.

Specifically, the network device may configure, by using higher layer signaling, for example, RRC signaling, a plurality of DCI formats, a K value set corresponding to each of the plurality of DCI formats, and an SLIV set corresponding to each of the plurality of DCI formats for the terminal, or preset a plurality of DCI formats, a K value set corresponding to each of the plurality of DCI formats, and an SLIV set corresponding to each of the plurality of DCI formats for the terminal, in a protocol.

Correspondingly, the terminal may determine a union set of K values in the plurality of K value sets, determine a union set of SLIVs in the plurality of SLIV sets, and determine a quantity of candidate PDSCH reception occasions corresponding to the union set of SLIVs. In this way, the terminal may determine a quantity of HARQ-ACK feedback units of the HARQ-ACK codebook based on the quantity of candidate PDSCH reception occasions and the union set of K values, for example, determine a product of the quantity of candidate PDSCH reception occasions and a quantity of elements in the union set of K values, and the product may be the quantity of HARQ-ACK feedback units of the HARQ-ACK codebook. Information bits of each HARQ-ACK feedback unit are A bits, and A is a positive integer.

Specifically, a PDSCH on each candidate PDSCH reception occasion may be used to carry $N_{TB}$ transport blocks (TBs). $N_{TB}$ is a positive integer, and may be configured by the network device for the terminal by using a higher layer parameter. A value of $N_{TB}$ is usually 1, 2, or the like. HARQ-ACK feedback may be configured as TB-level feedback or code block group (CBG)-level feedback. One TB may include a maximum of M CBGs. M is a positive integer, and may be configured by the network device for the terminal by using a higher layer parameter. A value of M is usually 1, 2, 4, 8, or the like. If it is TB-level feedback, HARQ-ACK feedback of each TB is one bit, and information bits of a feedback unit of each HARQ-ACK codebook are $A=N_{TB}$ bits. If it is CBG-level feedback, HARQ-ACK feedback of each TB is M bits, and information bits of a feedback unit of each HARQ-ACK codebook are $A=N_{TB}*M$ bits.

For ease of understanding, the following continues to use the SLIV set shown in FIG. 1 as an example for description.

Example 1: AK value set 1 corresponding to the DCI format 1_1 is {2, 3}, an SLIV set 1 corresponding to the DCI format 1_1 is {SLIV 1 to SLIV 5}, a K value set 2 corresponding to a DCI format 1_2 is {1, 2}, and an SLIV set 2 corresponding to the DCI format 1_2 is {SLIV 6 to SLIV 10}. Therefore, the terminal may determine that the union set of K values is {1, 2, 3} and includes three K values, determine that the union set of SLIVs is {SLIV 1 to SLIV 10}, and determine that the union set of SLIVs corresponds to four candidate PDSCH reception occasions. In this way, the terminal may determine that the quantity of HARQ-ACK feedback units of the HARQ-ACK codebook is 3*4=12.

Example 2: AK value set 1 corresponding to the DCI format 1_1 is {2, 3}, an SLIV set 1 corresponding to the DCI format 1_1 is {SLIV 9, SLIV 10}, a K value set 2 corresponding to a DCI format 1_2 is {1, 2}, and an SLIV set 2 corresponding to the DCI format 1_2 is {SLIV 1 to SLIV 8}. Therefore, the terminal may determine that the union set of K values is {1, 2, 3} and includes three K values, determine that the union set of SLIVs is {SLIV 1 to SLIV 10}, and determine that the union set of SLIVs corresponds to four candidate PDSCH reception occasions. Finally, the terminal may also determine that the quantity of HARQ-ACK feedback units of the HARQ-ACK codebook is 3*4=12.

It should be noted that the product of the quantity of candidate PDSCH reception occasions and a quantity of elements in the union set of K values may indicate a quantity of all combinations of the candidate PDSCH reception occasions and K values in the union set of K values. However, in all the combinations, there may be a combination, namely an invalid combination, that cannot be deduced based on correspondences between a DCI format and an SLIV and between the DCI format and a K value. If the quantity of HARQ-ACK feedback units of the HARQ-ACK codebook is determined based on the quantity of all combinations, a quantity of invalid combinations is used to determine the quantity of HARQ-ACK feedback units, and there is a redundant information bit. This increases resource overheads and reduces communication efficiency.

For example, all combinations of the four candidate PDSCH reception occasions and the K values in the union set of K values in Example 1 may be shown in Table 2.

TABLE 2

| K value | SLIV | Candidate PDSCH reception occasion |
|---|---|---|
| 1 | SLIV 1, SLIV 4, SLIV 7, SLIV 10 | First candidate PDSCH reception occasion |
| 1 (invalid combination) | SLIV 2, SLIV 5 | Second candidate PDSCH reception occasion |
| 1 | SLIV 3, SLIV 6, SLIV 8 | Third candidate PDSCH reception occasion |
| 1 | SLIV 9 | fourth candidate PDSCH reception occasion |

TABLE 2-continued

| K value | SLIV | Candidate PDSCH reception occasion |
|---|---|---|
| 2 | SLIV 1, SLIV 4, SLIV 7, SLIV 10 | First candidate PDSCH reception occasion |
| 2 | SLIV 2, SLIV 5 | Second candidate PDSCH reception occasion |
| 2 | SLIV 3, SLIV 6, SLIV 8 | Third candidate PDSCH reception occasion |
| 2 | SLIV 9 | Fourth candidate PDSCH reception occasion |
| 3 | SLIV 1, SLIV 4, SLIV 7, SLIV 10 | First candidate PDSCH reception occasion |
| 3 | SLIV 2, SLIV 5 | Second candidate PDSCH reception occasion |
| 3 | SLIV 3, SLIV 6, SLIV 8 | Third candidate PDSCH reception occasion |
| 3 (invalid combination) | SLIV 9 | Fourth candidate PDSCH reception occasion |

Based on correspondences between the DCI format 1_1 and the K value set 1 and between the DCI format 1_1 and the SLIV set 1, and correspondences between the DCI format 1_2 and the K value set 2 and between the DCI format 1_2 and the SLIV set 2 in Example 1, it may be deduced that K=1 does not correspond to the SLIV set 1 (SLIV 1 to SLIV 5), and K=3 does not correspond to the SLIV set 2 (SLIV 6 to SLIV 10). In this way, a combination of K=1 and the second candidate PDSCH reception occasion (SLIV 2, SLIV 5), and a combination of K=3 and the fourth candidate PDSCH reception occasion (SLIV 9) are invalid combinations in Table 2. In other words, actually, the PDSCH is not scheduled by using the combination of K=1 and the second candidate PDSCH reception occasion, and the combination of K=3 and the fourth candidate PDSCH reception occasion, but an HARQ-ACK feedback unit corresponding to feedback information of the PDSCH is reserved in the determined HARQ-ACK feedback units of the HARQ-ACK codebook. As a result, there are two redundant HARQ-ACK feedback units in the HARQ-ACK feedback units. Further, if the HARQ-ACK is the TB-level feedback, there are $2*N_{TB}$ redundant information bits. If the HARQ-ACK is the CBG-level feedback, there are $2*N_{TB}*M$ redundant information bits.

For another example, all combinations of the four candidate PDSCH reception occasions and the K values in the union set of K values in Example 2 may be shown in Table 3.

TABLE 3

| K value | SLIV | Candidate PDSCH reception occasion |
|---|---|---|
| 1 | SLIV 1, SLIV 4, SLIV 7, SLIV 10 | First candidate PDSCH reception occasion |
| 1 | SLIV 2, SLIV 5 | Second candidate PDSCH reception occasion |
| 1 | SLIV 3, SLIV 6, SLIV 8 | Third candidate PDSCH reception occasion |
| 1 (invalid combination) | SLIV 9 | Fourth candidate PDSCH reception occasion |
| 2 | SLIV 1, SLIV 4, SLIV 7, SLIV 10 | First candidate PDSCH reception occasion |
| 2 | SLIV 2, SLIV 5 | Second candidate PDSCH reception occasion |
| 2 | SLIV 3, SLIV 6, SLIV 8 | Third candidate PDSCH reception occasion |
| 2 | SLIV 9 | Fourth candidate PDSCH reception occasion |
| 3 | SLIV 1, SLIV 4, SLIV 7, SLIV 10 | First candidate PDSCH reception occasion |

TABLE 3-continued

| K value | SLIV | Candidate PDSCH reception occasion |
|---|---|---|
| 3 (invalid combination) | SLIV 2, SLIV 5 | Second candidate PDSCH reception occasion |
| 3 (invalid combination) | SLIV 3, SLIV 6, SLIV 8 | Third candidate PDSCH reception occasion |
| 3 | SLIV 9 | Fourth candidate PDSCH reception occasion |

Based on correspondences between the DCI format 1_1 and the K value set 1 and between the DCI format 1_1 and the SLIV set 1, and correspondences between the DCI format 1_2 and the K value set 2 and between the DCI format 1_2 and the SLIV set 2 in Example 2, it may be deduced that K=1 does not correspond to the SLIV set 1 (SLIV 9, SLIV 10), and K=3 does not correspond to the SLIV set 2 (SLIV 1 to SLIV 8). In this way, a combination of K=1 and the fourth candidate PDSCH reception occasion (SLIV 9), a combination of K=3 and the second candidate PDSCH reception occasion (SLIV 2, SLIV 5), and a combination of K=3 and the third candidate PDSCH reception occasion (SLIV 3, SLIV 6, SLIV 8) are invalid combinations in Table 3. In other words, actually, the PDSCH is not scheduled by using the combination of K=1 and the fourth candidate PDSCH reception occasion, the combination of K=3 and the second candidate PDSCH reception occasion, and the combination of K=3 and the third candidate PDSCH reception occasion, but an HARQ-ACK feedback unit corresponding to feedback information of the PDSCH is reserved in the determined HARQ-ACK feedback units. As a result, there are three redundant HARQ-ACK feedback units in the determined HARQ-ACK feedback units. Further, if the HARQ-ACK is the TB-level feedback, there are $3*N_{TB}$ redundant information bits. If the HARQ-ACK is the CBG-level feedback, there are $3*N_{TB}*M$ redundant information bits.

Embodiments of this application provide a method for determining an HARQ-ACK codebook, to reduce a redundant information bit, reduce resource overheads, and further improve communication efficiency such as to resolve the foregoing problem.

In addition, in embodiments of this application, terms such as "for example" and "such as" are used to represent giving an example, an illustration, or a description. Any embodiment or design solution described as an "example" in this application should not be explained as being more preferred or having more advantages than another embodiment or design solution. Exactly, the term "example" is used to present a concept in a specific manner.

In embodiments of this application, sometimes a subscript such as $W_1$ may be written in an incorrect form such as W1. Expressed meanings are consistent when differences are not emphasized.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

Figure 4:
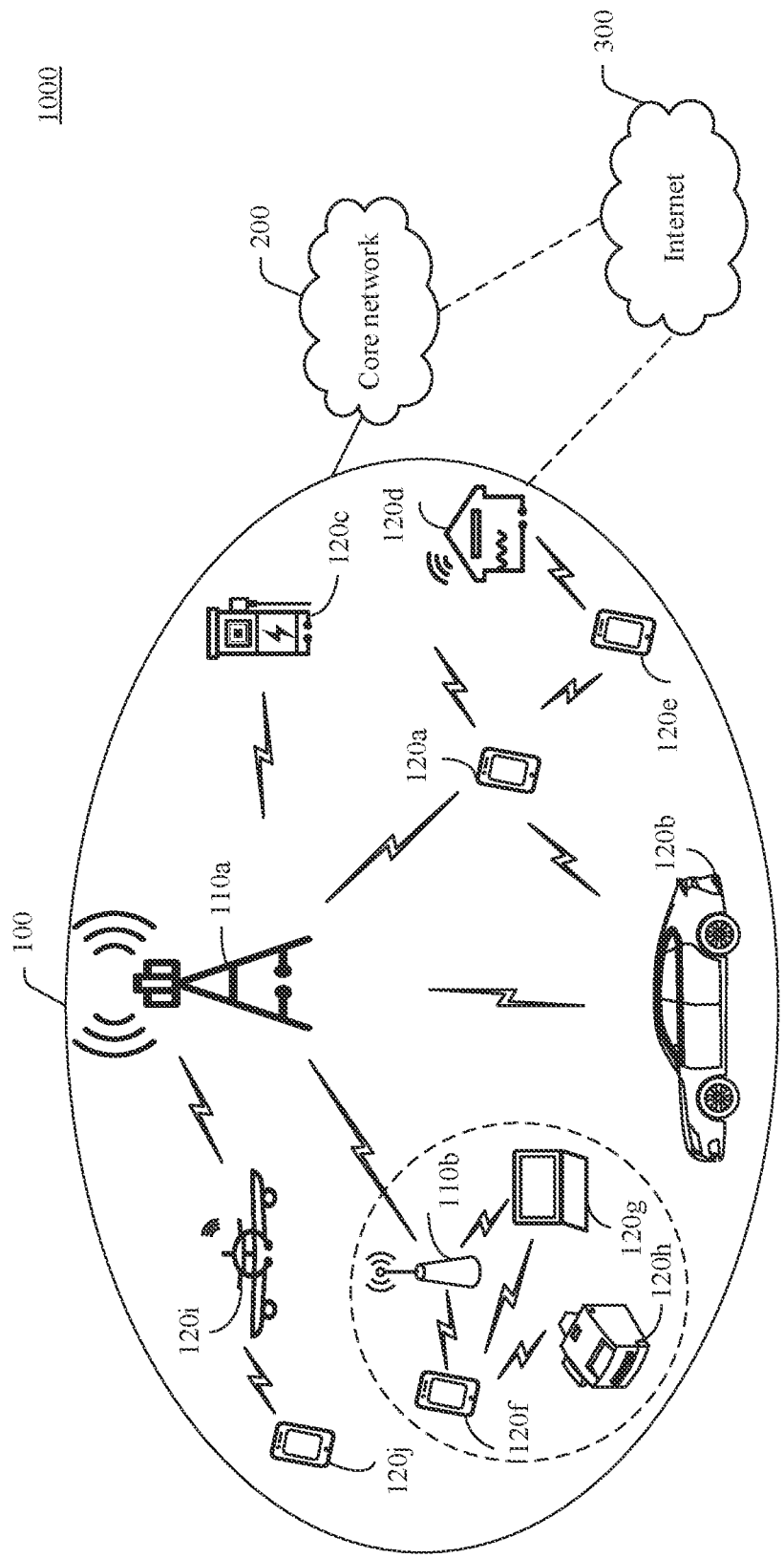
FIG. 4 is a schematic diagram of an architecture of a communication system according to an embodiment of this application.

FIG. 4 is a schematic diagram of an architecture of a communication system to which a method provided in embodiments of this application is applicable. As shown in FIG. 4, the communication system 1000 includes a radio access network 100 and a core network 200. Optionally, the communication system 1000 may further include an internet 300. The radio access network 100 may include at least one radio access network device (for example, 110a and 110b in FIG. 4), and may further include at least one terminal (for example, 120a to 120j in FIG. 1). The terminal is connected to the radio access network device in a wireless manner, and the radio access network device is connected to the core network in a wireless or wired manner. A core network device and the radio access network device may be independent and different physical devices, or functions of the core network device and logical functions of the radio access network device are integrated into a same physical device, or a part of functions of the core network device and a part of functions of the radio access network device are integrated into one physical device. A wired or wireless manner may be used for connection between terminals and between radio access network devices. FIG. 4 is merely a schematic diagram. The communication system may further include other network devices, for example, a wireless relay device and a wireless backhaul device, which are not shown in FIG. 4.

The radio access network device may be a base station, an evolved NodeB (eNodeB), a transmission reception point (TRP), a next generation NodeB (gNB) in a 5th generation (5G) mobile communication system, a next generation NodeB in a 6th generation (6G) mobile communication system, a base station in a future mobile communication system, an access node in a Wi-Fi system, or the like; or may be a module or unit that completes a part of functions of a base station, for example, may be a central unit (CU) or a distributed unit (DU). The radio access network device may be a macro base station (for example, 110a in FIG. 4), a micro base station or an indoor base station (for example, 110b in FIG. 4), a relay node, a donor node, or the like. A specific technology and a specific device form that are used by the radio access network device are not limited in embodiments of this application. For ease of description, the following uses an example in which a base station is used as the radio access network device for description. The radio access network device may also be briefly referred to as a network device.

The terminal may also be referred to as a terminal device, user equipment (UE), a mobile station, a mobile terminal, or the like. The terminal may be widely applied to various scenarios such as device-to-device (D2D), vehicle-to-everything (V2X) communication, machine type communication (MTC), an internet of things (IoT), virtual reality, augmented reality, industrial control, autonomous driving, telemedicine, a smart grid, smart furniture, a smart office, a smart wearable device, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a robotic arm, a smart home device, or the like. A specific technology and a specific device form that are used by the terminal are not limited in embodiments of this application.

The base station and the terminal may be at fixed locations, or may be mobile. The base station and the terminal each may be deployed on land, including an indoor or outdoor device, a handheld device, or a vehicle-mounted device, may be deployed on the water, or may be deployed on an airplane, a balloon, or an artificial satellite in the air. Application scenarios of the base station and the terminal are not limited in embodiments of this application.

Roles of the base station and the terminal may be relative. For example, a helicopter or an uncrewed aerial vehicle 120i in FIG. 4 may be configured as a mobile base station. For a terminal 120j that accesses the radio access network 100 by using 120i, the terminal 120i is a base station. However, for the base station 110a, 120i is a terminal, that is, 110a and 120i communicate with each other by using a wireless air interface protocol. Certainly, 110a and 120i may also communicate with each other by using an interface protocol between base stations. In this case, for 110a, 120i is also a base station. Therefore, both the base station and the terminal may be collectively referred to as communication apparatuses. 110a and 110b in FIG. 4 may be referred to as communication apparatuses having a base station function. 120a to 120j in FIG. 4 may be referred to as communication apparatuses having a terminal function.

In embodiments of this application, the base station function may be performed by a module (such as a chip) in the base station, or may be performed by a control subsystem including the base station function. The control subsystem including the base station function herein may be a control center in the foregoing terminal application scenarios such as a smart grid, industrial control, intelligent transportation, and a smart city. The terminal function may alternatively be performed by a module (such as a chip or a modem) in the terminal, or may be performed by an apparatus including the terminal function.

In this application, the base station sends a downlink signal or downlink information to the terminal, and the downlink information is carried on a downlink channel. The terminal sends an uplink signal or uplink information to the base station, and the uplink information is carried on an uplink channel.

In embodiments of this application, a PDSCH, a PUCCH, and a PUSCH are merely used as examples of a downlink data channel, an uplink control channel, and an uplink data channel. In different systems and different scenarios, a data channel and a control channel may have different names. This is not limited in embodiments of this application.

The following describes the method provided in embodiments of this application in detail with reference to FIG. 5 to FIG. 11.

Figure 5:
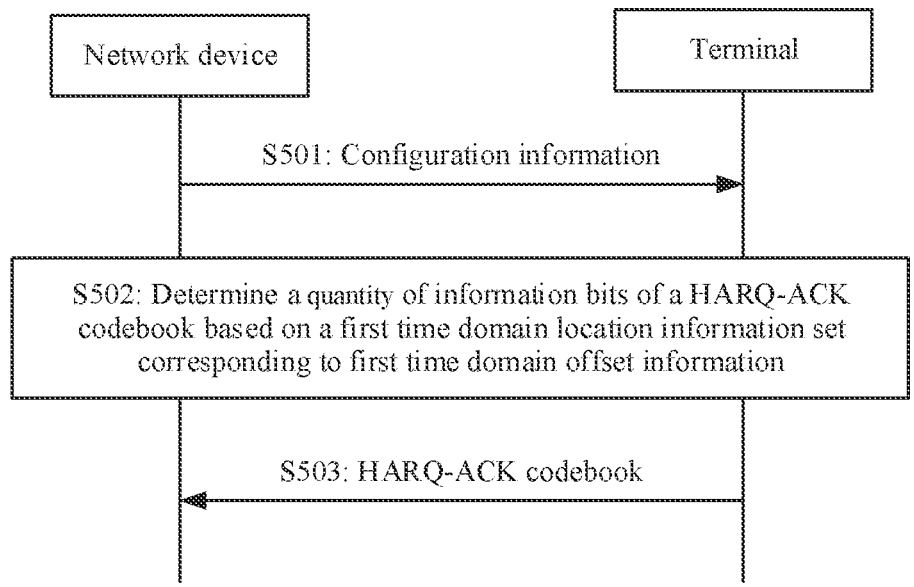
FIG. 5 is a schematic flowchart of a method for determining a hybrid automatic repeat request-acknowledgement HARQ-ACK codebook according to an embodiment of this application.

For example, FIG. 5 is a schematic flowchart 1 of the method for determining an HARQ-ACK codebook according to an embodiment of this application. The method is applicable to communication between the terminal and the network device shown in FIG. 4.

As shown in FIG. 5, the method includes the following steps.

S501: The network device sends configuration information to the terminal, and the terminal receives the configuration information from the network device.

The configuration information may be used by the network device and the terminal to determine a quantity of HARQ-ACK feedback units of an HARQ-ACK codebook, so as to further determine a quantity of information bits of the HARQ-ACK codebook based on the quantity of HARQ-ACK feedback units. The configuration information may include information about a plurality of downlink serving cells corresponding to each uplink serving cell carrying a PUCCH. The information about the plurality of downlink serving cells may include at least one of a plurality of pieces of information about each downlink serving cell: DCI format configuration information, time domain offset configuration information, or time domain location configuration information.

For example, descriptions are provided by using DCI format configuration information, time domain offset configuration information, and time domain location configuration information of one downlink serving cell as an example.

The DCI format configuration information may include N DCI formats, where N is a positive integer, to indicate that a downlink data channel corresponding to the downlink serving cell may be scheduled by using DCI in the N formats.

The time domain offset configuration information may include N time domain offset information sets. Each of the N DCI formats may correspond to one of the N time domain offset information sets. Time domain offset information in the time domain offset information set may indicate a time domain offset of an uplink control channel relative to a downlink data channel, namely, a time domain offset of a PUCCH relative to a PDSCH. The uplink control channel may be used to carry feedback information of the downlink data channel. The time domain offset information herein may be the foregoing K value, and the time domain offset information set may be a K value set.

The time domain location configuration information may include N time domain location information sets. Each of the N DCI formats may correspond to one of the N time domain location information sets. Time domain location information in the time domain location information set may indicate a time domain location of the downlink data channel, namely, a time domain location of the PDSCH. The time domain location information may be the foregoing SLIV, and the time domain location information set may be an SLIV set.

For ease of understanding, the following continues to use Example 1 and Example 2 as examples for description.

Example 1

DCI format configuration information of a downlink serving cell 1 includes a DCI format 1_1 and a DCI format 1_2.

Time domain offset configuration information of the downlink serving cell 1 includes a K value set 1 and a K value set 2. The DCI format 1_1 corresponds to the K value set 1, and the DCI format 1_2 corresponds to the K value set 2. The K value set 1 is {2, 3}, and the K value set 2 is {1, 2}.

Time domain location configuration information of the downlink serving cell 1 includes an SLIV set 1 and an SLIV set 2. The DCI format 1_1 corresponds to the SLIV set 1, and the DCI format 1_2 corresponds to the SLIV set 2. The SLIV set 1 is {SLIV 1 to SLIV 5}, and the SLIV set 2 is {SLIV 6 to SLIV 10}.

Example 2

DCI format configuration information of a downlink serving cell 2 includes a DCI format 1_1 and a DCI format 1_2.

Time domain offset configuration information of the downlink serving cell 2 includes a K value set 1 and a K value set 2. The DCI format 1_1 corresponds to the K value set 1, and the DCI format 1_2 corresponds to the K value set 2. The K value set 1 is {2, 3}, and the K value set 2 is {1, 2}.

Time domain location configuration information of the downlink serving cell 2 includes an SLIV set 1 and an SLIV set 2. The DCI format 1_1 corresponds to the SLIV set 1, and the DCI format 1_2 corresponds to the SLIV set 2. The SLIV set 1 is {SLIV 9, SLIV 10}, and the SLIV set 2 is {SLIV 1 to SLIV 8}.

The network device may configure a plurality of uplink and downlink serving cells for the terminal. Therefore, the configuration information may further include uplink and downlink serving cell configuration information. The uplink and downlink serving cell configuration information may include: an identifier of an uplink serving cell used to carry a PUCCH, and an identifier of a downlink serving cell corresponding to each uplink serving cell that may be used to carry a PUCCH. One uplink serving cell that may be used to carry a PUCCH may correspond to a plurality of downlink serving cells. In this way, the terminal may determine a correspondence between the uplink serving cell and the downlink serving cell based on the uplink and downlink serving cell configuration information, thereby ensuring communication reliability.

The configuration information may further include Type-1 HARQ-ACK codebook configuration information, to indicate that the HARQ-ACK codebook is specifically a Type-1 HARQ-ACK codebook. Because a quantity of information bits of the Type-1 HARQ-ACK codebook needs to be determined in advance based on the configuration information, and the configuration information is updated in a semi-persistent manner, the Type-1 HARQ-ACK codebook may also be referred to as a semi-persistent codebook.

Further, it can be learned from the foregoing content that, because the configuration information may be updated in the semi-static manner, the network device may send the configuration information to the terminal when a running environment of the terminal changes. For example, if the terminal accesses a network by using the network device, the network device may deliver the configuration information to the terminal. For another example, if a service of the terminal changes, for example, a reliability requirement of the service changes or a type of the service changes, the network device may deliver corresponding configuration information to the terminal. For another example, if a communication environment of the terminal changes, for example, a quantity of devices in a cell in which the terminal is located changes, or a moving speed of the terminal changes, the network device may deliver corresponding configuration information to the terminal.

S502: The terminal and the network device determine the quantity of information bits of the HARQ-ACK codebook based on a first time domain location information set corresponding to first time domain offset information.

The first time domain offset information is an element in a first time domain offset information set. The first time domain offset information set is a union set of the foregoing N time domain offset information sets. The first time domain location information set is determined based on a first DCI format set corresponding to the first time domain offset information.

Specifically, the first DCI format set may be determined based on the N DCI formats and the N time domain offset information sets corresponding to the N DCI formats. A time domain offset information set corresponding to each DCI format in the first DCI format set includes the first time domain offset information. The first DCI format set may include M DCI formats, where any one of the M DCI formats is one of the foregoing N DCI formats, and M is a positive integer less than or equal to N. The first time domain location information set is a union set of M time domain location information sets corresponding to the M DCI formats, and any one of the M time domain location information sets is one of the N time domain location information sets. For one of the N DCI formats, when a time domain offset information set corresponding to the DCI format does not include the first time domain offset information, the DCI format does not belong to the first DCI format set.

The following provides descriptions by using an example in which S502 is performed by the terminal.

Optionally, the terminal may not only determine the first time domain location information set corresponding to the first time domain offset information, but also determine another time domain location information set corresponding to another element in the first time domain offset information set. The another element herein is time domain offset information other than the first time domain offset information in the first time domain offset information set. Time domain location information in the another time domain location information set is also time domain location information in the foregoing N time domain location information sets.

For example, the first time domain offset information set includes time domain offset information A1, time domain offset information B1, and time domain offset information C1. The terminal may determine a time domain location information set A2 corresponding to the time domain offset information A1, may determine a time domain location information set B2 corresponding to the time domain offset information B1, or may determine a time domain location information set C2 corresponding to the time domain offset information C1.

For a specific implementation of determining a time domain location information set corresponding to another element, refer to the foregoing related descriptions of determining the first time domain location information set corresponding to the first time domain offset information.

For ease of understanding, the following continues to use Example 1 and Example 2 as examples to describe how the terminal determines a time domain location information set corresponding to time domain offset information.

Example 1

First, the terminal may determine, based on a case in which the K value set 1 is {2, 3} and the K value set 2 is {1, 2}, that a union set of K values is {1, 2, 3}.

Then, the terminal may determine, based on a case in which the DCI format 1_1 corresponds to the K value set 1 and the DCI format 1_2 corresponds to the K value set 2, that K=1 corresponds to the DCI format 1_2, K=2 corresponds to the DCI format 1_1 and the DCI format 1_2, and K=3 corresponds to the DCI format 1_1.

In this way, the terminal may determine, based on a case in which the SLIV set 1 corresponding to the DCI format 1_1 is {SLIV 1 to SLIV 5} and the SLIV set 2 corresponding to the DCI format 1_2 is {SLIV 6 to SLIV 10}, that K=1 corresponds to the SLIV set 2, K=2 corresponds to the SLIV set 1 and the SLIV set 2, and K=3 corresponds to the SLIV set 1. In other words, K=1 corresponds to {SLIV 6 to SLIV 10}, K=2 corresponds to {SLIV 1 to SLIV 10}, and K=3 corresponds to {SLIV 1 to SLIV 5}.

Example 2

First, the terminal may determine, based on a case in which the K value set 1 is {2, 3} and the K value set 2 is {1, 2}, that a union set of K values is {1, 2, 3}.

Then, the terminal may determine, based on a case in which the DCI format 1_1 corresponds to the K value set 1 and the DCI format 1_2 corresponds to the K value set 2, that K=1 corresponds to the DCI format 1_2, K=2 corresponds to the DCI format 1_1 and the DCI format 1_2, and K=3 corresponds to the DCI format 1_1.

In this way, the terminal may determine, based on a case in which the SLIV set 1 corresponding to the DCI format 1_1 is {SLIV 9, SLIV 10} and the SLIV set 2 corresponding to the DCI format 1_2 is {SLIV 1 to SLIV 8}, that K=1 corresponds to the SLIV set 2, K=2 corresponds to the SLIV set 1 and the SLIV set 2, and K=3 corresponds to the SLIV set 1. In other words, K=1 corresponds to {SLIV 1 to SLIV 8}, K=2 corresponds to {SLIV 1 to SLIV 10}, and K=3 corresponds to {SLIV 9, SLIV 10}.

Further, after determining the first time domain location information set, the terminal may determine a quantity of candidate PDSCH reception occasions corresponding to the first time domain location information set, to determine the quantity of information bits of the HARQ-ACK codebook based on the quantity of reception occasions.

Specifically, the terminal may not only determine the quantity of candidate PDSCH reception occasions corresponding to the first time domain location information set, but also determine a quantity of candidate PDSCH reception occasions corresponding to the another time domain location information set. In this way, the terminal may determine the quantity of HARQ-ACK feedback units of the HARQ-ACK codebook based on the quantity of candidate PDSCH reception occasions corresponding to the first time domain location information set and the quantity of candidate PDSCH reception occasions corresponding to the another time domain location information set. For example, the terminal may determine a sum of the quantity of candidate PDSCH reception occasions corresponding to the first time domain location information set and the quantity of candidate PDSCH reception occasions corresponding to the another time domain location information set. The sum may be the quantity of HARQ-ACK feedback units.

For ease of understanding, the following continues to use Example 1 and Example 2 as examples to specifically describe how the terminal determines the quantity of HARQ-ACK feedback units based on a quantity of candidate PDSCH reception occasions.

Example 1

Figure 6:
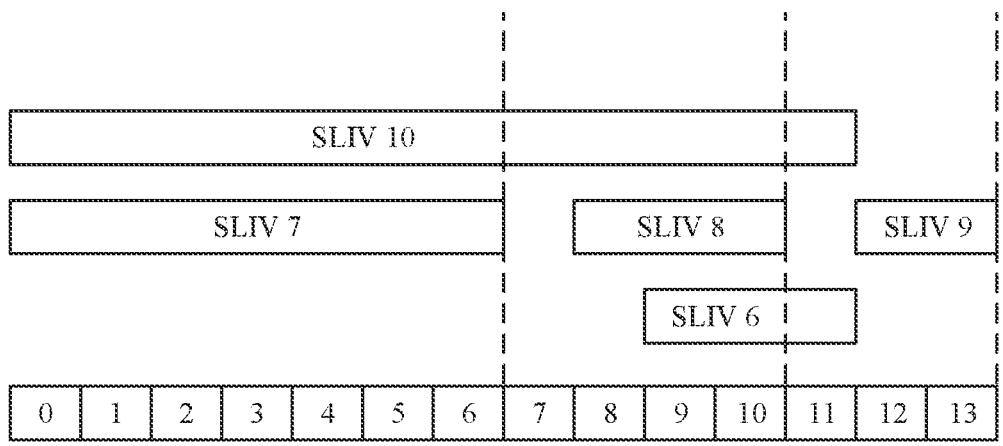
FIG. 6 is a schematic diagram 2 of a time domain location corresponding to a candidate PDSCH reception occasion according to an embodiment of this application.

A. As shown in FIG. 6, the terminal may determine, based on a case in which K=1 corresponds to {SLIV 6 to SLIV 10}, that in a time unit corresponding to K=1, {SLIV 7, SLIV 10} corresponds to a first candidate PDSCH reception occasion, {SLIV 6, SLIV 8} corresponds to a second candidate PDSCH reception occasion, and an SLIV 9 corresponds to a third candidate PDSCH reception occasion. In other words, K=1 corresponds to three candidate PDSCH reception occasions in total. In this application, the time unit may be a slot, or may be a sub-slot or a mini-slot.

B. As shown in FIG. 1, the terminal may determine, based on a case in which K=2 corresponds to {SLIV 1 to SLIV 10}, that in a time unit corresponding to K=2, {SLIV 1, SLIV 4, SLIV 7, SLIV 10} corresponds to a first candidate PDSCH reception occasion, {SLIV 2, SLIV 5} corresponds to a second candidate PDSCH reception occasion, {SLIV 3, SLIV 6, SLIV 8} corresponds to a third candidate PDSCH reception occasion, and an SLIV 9 corresponds to a fourth candidate PDSCH reception occasion. In other words, K=2 corresponds to four candidate PDSCH reception occasions in total.

Figure 7:
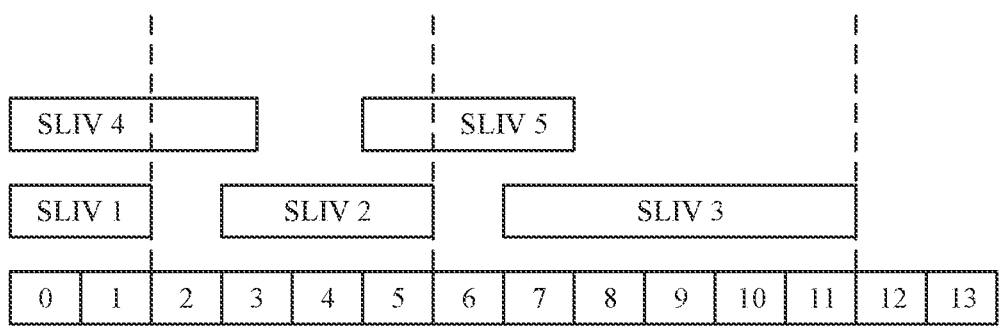
FIG. 7 is a schematic diagram 3 of a time domain location corresponding to a candidate PDSCH reception occasion according to an embodiment of this application.

C. As shown in FIG. 7, the terminal may determine, based on a case in which K=3 corresponds to {SLIV 1 to SLIV 5}, that in a time unit corresponding to K=3, {SLIV 1, SLIV 4} corresponds to a first candidate PDSCH reception occasion, {SLIV 2, SLIV 5} corresponds to a second candidate PDSCH reception occasion, and an SLIV 3 corresponds to a third candidate PDSCH reception occasion. In other words, K=3 corresponds to three candidate PDSCH reception occasions in total.

The terminal determines that the quantity of HARQ-ACK feedback units of the HARQ-ACK codebook is a sum of the three candidate PDSCH reception occasions corresponding to K=1, the four candidate PDSCH reception occasions corresponding to K=2, and the three candidate PDSCH reception occasions corresponding to K=3, that is, there are 10 HARQ-ACK feedback units. Compared with the existing manner in which 12 HARQ-ACK feedback units are determined in Example 1, in this manner, two redundant HARQ-ACK feedback units can be reduced. Further, if an HARQ-ACK is TB-level feedback, $2*N_{TB}$ redundant information bits can be reduced. If an HARQ-ACK is CBG-level feedback, $2*N_{TB}*M$ redundant information bits can be reduced.

For a specific implementation of determining the candidate PDSCH reception occasion, refer to related descriptions in the foregoing "3. Candidate PDSCH reception occasion".

Figure 8:
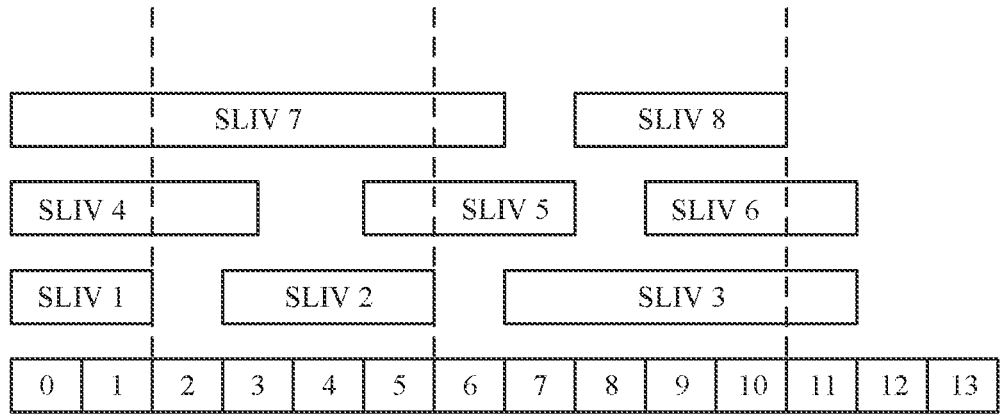
FIG. 8 is a schematic diagram 4 of a time domain location corresponding to a candidate PDSCH reception occasion according to an embodiment of this application.
Figure 9:
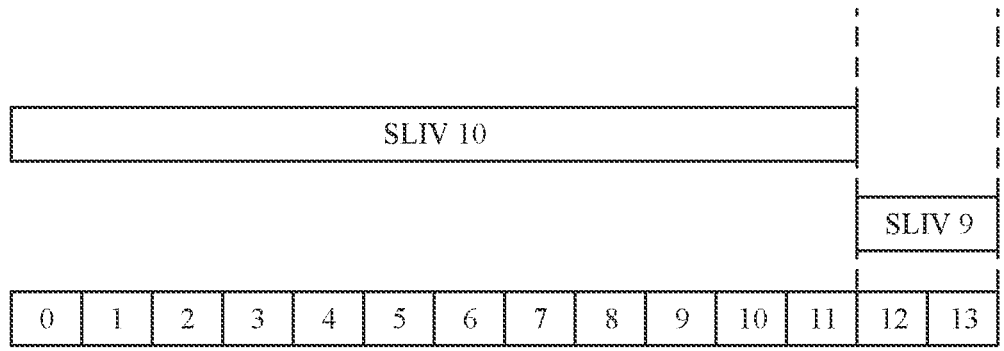
FIG. 9 is a schematic diagram 5 of a time domain location corresponding to a candidate PDSCH reception occasion according to an embodiment of this application.

Example 2 a. As shown in FIG. 8, the terminal may determine, based on a case in which K=1 corresponds to {SLIV 1 to SLIV 8}, that in a time unit corresponding to K=1, {SLIV 1, SLIV 4, SLIV 7} corresponds to a first candidate PDSCH reception occasion, {SLIV 2, SLIV 5} corresponds to a second candidate PDSCH reception occasion, and {SLIV 3, SLIV 6, SLIV 8} corresponds to a third candidate PDSCH reception occasion. In other words, K=1 corresponds to three candidate PDSCH reception occasions in total.

b. As shown in FIG. 1, the terminal may determine, based on a case in which K=2 corresponds to {SLIV 1 to SLIV 10}, that in a time unit corresponding to K=2, {SLIV 1, SLIV 4, SLIV 7, SLIV 10} corresponds to a first candidate PDSCH reception occasion, {SLIV 2, SLIV 5} corresponds to a second candidate PDSCH reception occasion, {SLIV 3, SLIV 6, SLIV 8} corresponds to a third candidate PDSCH reception occasion, and an SLIV 9 corresponds to a fourth candidate PDSCH reception occasion. In other words, K=2 corresponds to four candidate PDSCH reception occasions in total.

c. As shown in FIG. 9, the terminal may determine, based on a case in which K=3 corresponds to {SLIV 9, SLIV 10}, that in a time unit corresponding to K=3, an SLIV 10 corresponds to a first candidate PDSCH reception occasion, and an SLIV 9 corresponds to a second candidate PDSCH reception occasion. In other words, K=3 corresponds to two candidate PDSCH reception occasions in total.

Further, the terminal determines that the quantity of HARQ-ACK feedback units of the HARQ-ACK codebook is a sum of the three candidate PDSCH reception occasions corresponding to K=1, the four candidate PDSCH reception occasions corresponding to K=2, and the two candidate PDSCH reception occasions corresponding to K=3, that is, there are nine HARQ-ACK feedback units. Compared with the existing manner in which 12 HARQ-ACK feedback units are determined in Example 2, in this manner, three redundant HARQ-ACK feedback units can be reduced. Further, if an HARQ-ACK is TB-level feedback, $3*N_{TB}$ redundant information bits can be reduced. If an HARQ-ACK is CBG-level feedback, $3*N_{TB}*M$ redundant information bits can be reduced.

Optionally, the terminal may further determine a location of feedback information of the PDSCH in an information bit sequence of the HARQ-ACK codebook based on the first time domain offset information and the first time domain location information.

Further, the terminal may correspondingly determine, based on a first location of the first time domain offset information in the first time domain offset information set and a second location of a candidate PDSCH reception occasion that corresponds to the first time domain offset information and that is in all candidate PDSCH reception occasions corresponding to the first time domain offset information set, the location of the feedback information of the PDSCH in the information bit sequence of the HARQ-ACK codebook. The first location may be determined in an order of values of the first time domain offset information. The second location may be determined in an order in which all the candidate PDSCH reception occasions are determined.

For ease of understanding, the following continues to use Example 1 and Example 2 as examples to specifically describe how the terminal determines the location of the feedback information of the PDSCH in the information bit sequence of the HARQ-ACK codebook.

Example 1

The union set {1, 2, 3} of K values includes, in an order of values, K=3→K=2→K=1. As shown in FIG. 6, an order of the three candidate PDSCH reception occasions determined based on {SLIV 1 to SLIV 5} in the time unit corresponding to K=3 is: the first candidate PDSCH reception occasion→the second candidate PDSCH reception occasion→the third candidate PDSCH reception occasion. As shown in FIG. 1, an order of the four candidate PDSCH reception occasions determined based on {SLIV 1 to SLIV 10} in the time unit corresponding to K=2 is: the first candidate PDSCH reception occasion→the second candidate PDSCH reception occasion→the third candidate PDSCH reception occasion→the fourth candidate PDSCH reception occasion. As shown in FIG. 7, an order of the three candidate PDSCH reception occasions determined based on {SLIV 6 to SLIV 10} in the time unit corresponding to K=1 is: the first candidate PDSCH reception occasion→the second candidate PDSCH reception occasion→the third candidate PDSCH reception occasion. In this way, the location, determined by the terminal, of the feedback information of the PDSCH in the information bit sequence of the HARQ-ACK codebook may be shown in Table 4.

TABLE 4

| Order of K values | Order of candidate PDSCH reception occasions | Information bit sequence |
|---|---|---|
| K = 3 | First candidate PDSCH reception occasion | Feedback information of a PDSCH 1 |
|  | Second candidate PDSCH reception occasion | Feedback information of a PDSCH 2 |
|  | Third candidate PDSCH reception occasion | Feedback information of a PDSCH 3 |
| K = 2 | First candidate PDSCH reception occasion | Feedback information of a PDSCH 4 |
|  | Second candidate PDSCH reception occasion | Feedback information of a PDSCH 5 |

TABLE 4-continued

| Order of K values | Order of candidate PDSCH reception occasions | Information bit sequence |
|---|---|---|
|  | Third candidate PDSCH reception occasion | Feedback information of a PDSCH 6 |
|  | Fourth candidate PDSCH reception occasion | Feedback information of a PDSCH 7 |
| K = 1 | First candidate PDSCH reception occasion | Feedback information of a PDSCH 8 |
|  | Second candidate PDSCH reception occasion | Feedback information of a PDSCH 9 |
|  | Third candidate PDSCH reception occasion | Feedback information of a PDSCH 10 |

It can be learned from the content shown in Table 4 that, in the time unit corresponding to K=3, K=3 is the first in the order, and the first candidate PDSCH reception occasion corresponding to K=3 is the first in the corresponding order, in this case, the feedback information of the PDSCH 1 is located at a first location in the information bit sequence of the HARQ-ACK codebook. In other words, the PDSCH 1 may be scheduled based on K=3 and {SLIV 1, SLIV 4} corresponding to the first PDSCH reception occasion. In the time unit corresponding to K=3, K=3 is the first in the order, and the second candidate PDSCH reception occasion corresponding to K=3 is the second in the corresponding order, in this case, the feedback information of the PDSCH 2 is located at a second location in the information bit sequence of the HARQ-ACK codebook. In other words, the PDSCH 2 may be scheduled based on K=3 and {SLIV 2, SLIV 5} corresponding to the second PDSCH reception occasion. By analogy, in the time unit corresponding to K=1, K=1 is the third in the order, and the third candidate PDSCH reception occasion corresponding to K=1 is the third in the corresponding order, in this case, the feedback information of the PDSCH 10 is located at a tenth location in the information bit sequence of the HARQ-ACK codebook. In other words, the PDSCH 10 may be scheduled based on K=1 and the SLIV 9 corresponding to the third PDSCH reception occasion.

Example 2

The union set {1, 2, 3} of K values may include, in an order of values, K=3→K=2→K=1. As shown in FIG. 8, an order of the two candidate PDSCH reception occasions determined based on {SLIV 9, SLIV 10} in the time unit corresponding to K=3 is: the first candidate PDSCH reception occasion→the second candidate PDSCH reception occasion. As shown in FIG. 1, an order of the four candidate PDSCH reception occasions determined based on {SLIV 1 to SLIV 10} in the time unit corresponding to K=2 is: the first candidate PDSCH reception occasion→the second candidate PDSCH reception occasion→the third candidate PDSCH reception occasion→the fourth candidate PDSCH reception occasion. As shown in FIG. 9, an order of the three candidate PDSCH reception occasions determined based on {SLIV 1 to SLIV 8} in the time unit corresponding to K=1 is: the first candidate PDSCH reception occasion→the second candidate PDSCH reception occasion→the third candidate PDSCH reception occasion. In this way, the location, determined by the terminal, of the feedback information of the PDSCH in the information bit sequence of the HARQ-ACK codebook may be shown in Table 5.

TABLE 5

| Order of K values | Order of candidate PDSCH reception occasions | Information bit sequence |
| --- | --- | --- |
| K = 3 | First candidate PDSCH reception occasion | Feedback information of a PDSCH 1 |
|  | Second candidate PDSCH reception occasion | Feedback information of a PDSCH 2 |
| K = 2 | First candidate PDSCH reception occasion | Feedback information of a PDSCH 3 |
|  | Second candidate PDSCH reception occasion | Feedback information of a PDSCH 4 |
|  | Third candidate PDSCH reception occasion | Feedback information of a PDSCH 5 |
|  | Fourth candidate PDSCH reception occasion | Feedback information of a PDSCH 6 |
| K = 1 | First candidate PDSCH reception occasion | Feedback information of a PDSCH 7 |
|  | Second candidate PDSCH reception occasion | Feedback information of a PDSCH 8 |
|  | Third candidate PDSCH reception occasion | Feedback information of a PDSCH 9 |

It can be learned from the content shown in Table 5 that, in the time unit corresponding to K=3, K=3 is the first in the order, and the first candidate PDSCH reception occasion corresponding to K=3 is the first in the corresponding order, in this case, the feedback information of the PDSCH 1 is located at a first location in the information bit sequence of the HARQ-ACK codebook. In other words, the PDSCH 1 may be scheduled based on K=3 and the SLIV 10 corresponding to the first PDSCH reception occasion. In the time unit corresponding to K=3, K=3 is the first in the order, and the second candidate PDSCH reception occasion corresponding to K=3 is the second in the corresponding order, in this case, the feedback information of the PDSCH 2 is located at a second location in the information bit sequence of the HARQ-ACK codebook. In other words, the PDSCH 2 may be scheduled based on K=3 and the SLIV 9 corresponding to the second PDSCH reception occasion. By analogy, in the time unit corresponding to K=1, K=1 is the third in the order, and the second candidate PDSCH reception occasion corresponding to K=1 is the third in the corresponding order, in this case, the feedback information of the PDSCH 9 is located at a ninth location in the information bit sequence of the HARQ-ACK codebook. In other words, the PDSCH 9 may be scheduled based on K=1 and {SLIV 3, SLIV 6, SLIV 8} corresponding to the second PDSCH reception occasion.

For a specific implementation in which S502 is performed by the network device, refer to a specific implementation process of the terminal.

Optionally, in some application scenarios, the network device may send one or more pieces of DCI to the terminal. Each piece of DCI corresponds to one DCI format, indicates one corresponding element in the time domain location information set, for example, indicates the first time domain location information in the first time domain location information set, and indicates one corresponding element in the time domain offset information set, for example, indicates the first time domain offset information in the first time domain offset information set. Further, the network device sends the PDSCH to the terminal at a time domain location corresponding to the time domain offset information indicated by the DCI, for example, a time domain location information corresponding to the first time domain location information. The terminal receives the PDSCH from the network device at the time domain location corresponding to the time domain offset information indicated by the DCI, for example, the time domain location corresponding to the first time domain location information.

For ease of understanding, the following continues to use Example 1 and Example 2 as examples for description.

Example 1

Refer to FIG. 1, the network device may send DCI 1 to the terminal on a symbol 0 in a slot n, and send DCI 2 to the terminal on a symbol 1 in the slot n, and the terminal may prepare for receiving downlink data based on indications of the DCI 1 and the DCI 2. The DCI 1 indicates that the DCI format 1_1 separately corresponds to K=2 and the SLIV 2, and the DCI 2 indicates that the DCI format 1_2 separately corresponds to K=2 and the SLIV 6.

Figure 10:
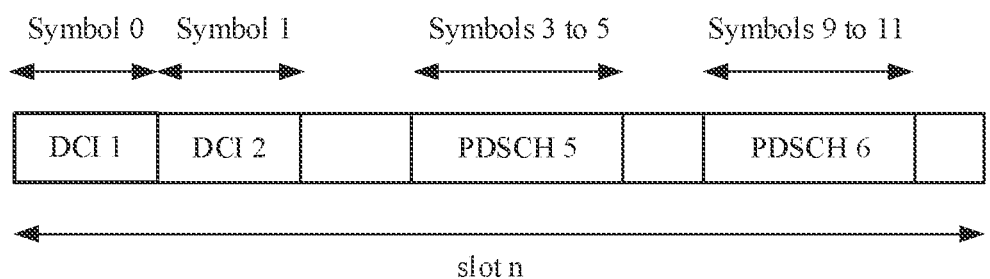
FIG. 10 is a schematic diagram 1 of time domain locations of DCI and a PDSCH according to an embodiment of this application.

Further, refer to FIG. 1 and FIG. 10, the network device sends, based on the DCI 1, the PDSCH 5 to the terminal on symbols 3 to 5 in the slot n that are indicated by the SLIV 2, and sends, based on the DCI 2, the PDSCH 6 to the terminal on symbols 9 to 11 in the slot n that are indicated by the SLIV 6. Correspondingly, the terminal may receive the PDSCH 5 from the network device on the symbols 3 to 5 in the slot n, and receive the PDSCH 6 from the network device on the symbols 9 to 11 in the slot n.

Example 2

Refer to FIG. 1, the network device may send DCI 1 to the terminal on a symbol 0 in a slot n, and send DCI 2 to the terminal on a symbol 1 in the slot n, and the terminal may prepare for receiving downlink data based on indications of the DCI 1 and the DCI 2. The DCI 1 indicates that the DCI format 1_1 separately corresponds to K=2 and the SLIV 10, and the DCI 2 indicates that the DCI format 1_1 separately corresponds to K=2 and the SLIV 9.

Figure 11:
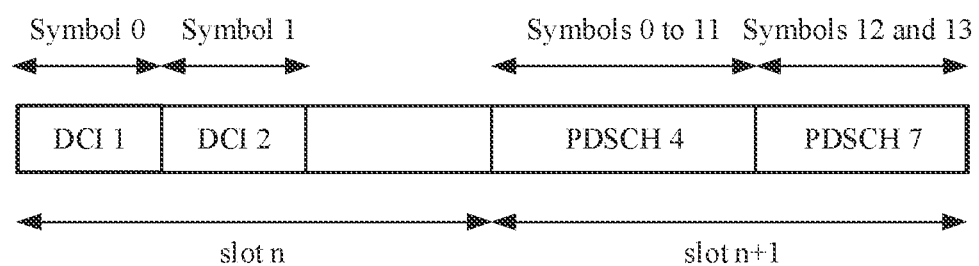
FIG. 11 is a schematic diagram 2 of time domain locations of DCI and a PDSCH according to an embodiment of this application.

Further, refer to FIG. 1 and FIG. 11, the network device sends, based on the DCI 1, the PDSCH 4 to the terminal on symbols 0 to 11 in a slot n+1 that are indicated by the SLIV 10, and sends, based on the DCI 2, the PDSCH 7 to the terminal on symbols 12 and 13 in the slot n+1 that are indicated by the SLIV 9. Correspondingly, the terminal may receive the PDSCH 4 from the network device on the symbols 0 to 11 in the slot n+1, and receive the PDSCH 7 from the network device on the symbols 12 and 13 in the slot n+1.

S503: The terminal sends the HARQ-ACK codebook to the network device.

The terminal may parse downlink data carried on the PDSCH, and generate the feedback information of the PDSCH based on a parsing result. If the terminal successfully parses the downlink data, the feedback information of the PDSCH is an ACK. Otherwise, if the terminal fails to parse the downlink data, the feedback information of the PDSCH is a NACK. Further, the terminal sends, at the time domain location indicated by the DCI, the HARQ-ACK codebook to the network device based on the quantity of information bits of the HARQ-ACK codebook, the feedback information of the PDSCH, and the location of the feedback information of the PDSCH in the information bit sequence of the HARQ-ACK codebook. Feedback information of an unreceived PDSCH may also be written into a corresponding location in the information bit sequence of the HARQ-ACK codebook, and the feedback information of the unreceived PDSCH may be a NACK.

For ease of understanding, the following continues to use Example 1 and Example 2 as examples for description.

Example 1

If the terminal successfully parses downlink data carried on the PDSCH 5 and the PDSCH 6, the feedback information of the PDSCH 5 and the PDSCH 6 may be ACKs: an ACK 1 and an ACK 2. If a single TB is separately carried on the PDSCH 5 and the PDSCH 6, and a feedback manner is the TB-level feedback, both the ACK 1 and the ACK 2 may be one bit.

Further, it is determined, based on a location correspondence shown in Table 4, that the feedback information of the PDSCH 5 (K=2, SLIV 2) is located at a fifth location in the HARQ-ACK codebook 1, and the feedback information of the PDSCH 6 (K=2, SLIV 6) is located at a sixth location in the HARQ-ACK codebook 1. Because the terminal fails to receive PDSCHs respectively corresponding to first to fourth locations and seventh to tenth locations in the HARQ-ACK codebook 1, it is determined that NACKs are at the first to fourth locations and the seventh to tenth locations in the HARQ-ACK codebook 1. Therefore, the HARQ-ACK codebook 1 generated by the terminal may be shown in Table 6.

TABLE 6

| HARQ-ACK codebook 1 |
| --- |
| NACK 1 |
| NACK 2 |
| NACK 3 |
| NACK 4 |
| ACK 1 |
| ACK 2 |
| NACK 5 |
| NACK 6 |
| NACK 7 |
| NACK 8 |

Example 2

If the terminal successfully parses downlink data 1 carried on the PDSCH 4, but fails to parse downlink data 2 carried on the PDSCH 7, the feedback information of the PDSCH 4 may be an ACK 1, and the feedback information of the PDSCH 7 may be a NACK 1. If two TBs are carried on each of the PDSCH 4 and the PDSCH 7, and a feedback manner is the TB-level feedback, both the ACK 1 and the NACK 1 may be two bits.

Further, it is determined, based on a location correspondence shown in Table 5, that the feedback information of the PDSCH 4 (K=2, SLIV 10) is located at a fourth location in an HARQ-ACK codebook 2, and the feedback information of the PDSCH 7 (K=2, SLIV 9) is located at a seventh location in the HARQ-ACK codebook 2. Because the terminal fails to receive PDSCHs respectively corresponding to first to third locations, fifth and sixth locations, and eighth and ninth locations in an HARQ-ACK codebook 1, it is determined that NACKs are at the first to third locations, the fifth and sixth locations, and the eighth and ninth locations in the HARQ-ACK codebook 2. Therefore, the generated HARQ-ACK codebook 2 may be shown in Table 7.

TABLE 7

| HARQ-ACK codebook 2 |
| --- |
| NACK 2 |
| NACK 3 |

TABLE 7-continued

| HARQ-ACK codebook 2 |
| --- |
| NACK 4 |
| ACK 1 |
| NACK 5 |
| NACK 6 |
| NACK 1 |
| NACK 7 |
| NACK 8 |

Further, the network device may receive the HARQ-ACK codebook from the terminal, and correctly parse the HARQ-ACK codebook based on the determined quantity of information bits of the HARQ-ACK codebook and the location of the feedback information of the PDSCH in the information bit sequence of the HARQ-ACK codebook, so as to obtain, at a location corresponding to the HARQ-ACK codebook, the feedback information of the PDSCH, and determine, based on the feedback information, whether corresponding downlink data needs to be retransmitted to the terminal. If the feedback information of the PDSCH is an ACK, the network device does not need to retransmit, to the terminal, downlink data carried on the PDSCH. If the feedback information of the PDSCH is a NACK, and the PDSCH has been sent, the network device may determine that downlink data carried on the PDSCH needs to be retransmitted to the terminal. If the feedback information of the PDSCH is a NACK, and the PDSCH is not sent, the network device may determine not to perform further processing.

For ease of understanding, the following continues to use Example 1 and Example 2 as examples for description.

Example 1

After receiving the HARQ-ACK codebook 1, the network device may determine, based on the ACK 1 and the ACK 2, that the downlink data 1 and the downlink data 2 do not need to be retransmitted, and determine not to further process the NACK 1 to the NACK 8.

Example 2

After receiving the HARQ-ACK codebook 2, the network device may determine, based on the ACK 1 and the NACK 1, that the downlink data 1 does not need to be retransmitted but the downlink data 2 needs to be retransmitted, and determine not to further process the NACK 2 to the NACK 8.

According to the method shown in FIG. 5, each of the N DCI formats may correspond to one of the N time domain offset information sets, and each of the N DCI formats may correspond to one of the N time domain location information sets. Therefore, a combination that has a correspondence and that is of the first time domain offset information and the first time domain location information set may be determined based on the N DCI formats from all combinations of the time domain offset information in the N time domain offset information sets and the time domain location information in the N time domain location information sets. Compared with the existing manner in which the quantity of information bits is determined based on all combinations of union sets of the N time domain offset information sets and union sets of the N time domain location information sets, in this manner in which the quantity of information bits is determined based on the combination that has the correspondence, a redundant information bit can be reduced, resource overheads can be reduced, and communication efficiency can be further improved.

The foregoing describes in detail the method provided in embodiments of this application with reference to FIG. 5 to FIG. 11. The following describes in detail a communication apparatus configured to perform the method provided in embodiments of this application with reference to FIG. 12 and FIG. 13.

Figure 12:
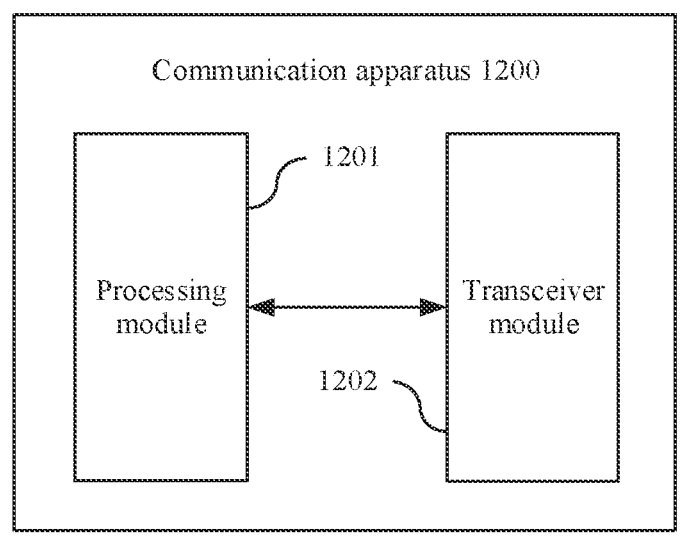
FIG. 12 is a schematic diagram 1 of a structure of a communication apparatus according to an embodiment of this application.

For example, FIG. 12 is a schematic diagram 1 of a structure of a communication apparatus according to an embodiment of this application. As shown in FIG. 12, the communication apparatus 1200 includes a processing module 1201 and a transceiver module 1202. For ease of description, FIG. 12 merely shows main components of the communication apparatus.

In some embodiments, the communication apparatus 1200 is applicable to the communication system shown in FIG. 4, and performs a function of the terminal used in the method shown in FIG. 5.

The transceiver module 1202 is configured to perform a function of the terminal in S501 and S503.

The processing module 1201 is configured to perform a function of the terminal in S502.

Optionally, the transceiver module 1202 may include a receiving module and a sending module (not shown in FIG. 12). The receiving module is configured to implement a receiving function of the communication apparatus 1200, and the sending module is configured to implement a sending function of the communication apparatus 1200.

Optionally, the communication apparatus 1200 may further include a storage module (not shown in FIG. 12). The storage module stores a program or instructions. When the processing module 1201 executes the program or the instructions, the communication apparatus 1200 can perform a function of determining a quantity of information bits of an HARQ-ACK codebook based on configuration information in the method shown in FIG. 5.

The processing module 1201 in the communication apparatus 1200 may be implemented by using a processor or a processor-related circuit component, and may be a processor or a processing unit. The transceiver module 1202 may be implemented by using a transceiver or a transceiver-related circuit component, and may be a transceiver or a transceiver unit.

It should be noted that the communication apparatus 1200 may be the terminal shown in FIG. 4, or may be a chip (system) or another part or component disposed on the terminal, or an apparatus including the terminal. This is not limited in this embodiment of this application.

In some other embodiments, the communication apparatus 1200 is applicable to the communication system shown in FIG. 4, and performs a function of the network device used in the method shown in FIG. 5.

The transceiver module 1202 is configured to perform a function of the network device in S501 and S503.

The processing module 1201 is configured to perform a function of the network device in S502.

Optionally, the transceiver module 1202 may include a receiving module and a sending module (not shown in FIG. 12). The receiving module is configured to implement a receiving function of the communication apparatus 1200, and the sending module is configured to implement a sending function of the communication apparatus 1200.

Optionally, the communication apparatus 1200 may further include a storage module (not shown in FIG. 12). The storage module stores a program or instructions. When the processing module 1201 executes the program or the instructions, the communication apparatus 1200 can perform a function of determining a quantity of information bits of an HARQ-ACK codebook based on configuration information in the method shown in FIG. 5.

The processing module 1201 in the communication apparatus 1200 may be implemented by using a processor or a processor-related circuit component, and may be a processor or a processing unit. The transceiver module 1202 may be implemented by using a transceiver or a transceiver-related circuit component, and may be a transceiver or a transceiver unit.

It should be noted that the communication apparatus 1200 may be the network device shown in FIG. 4, or may be a chip (system) or another part or component disposed on the network device, or an apparatus including the network device. This is not limited in this embodiment of this application.

In addition, division into the foregoing functional modules is only used as an example for description. In an actual application, the foregoing functions may be allocated to different functional modules for implementation based on a requirement, in other words, an internal structure of the communication apparatus 1200 is divided into different functional modules, to implement all or a part of the functions described above. In addition, the communication apparatus 1200 provided in the foregoing embodiment and the method embodiment pertain to a same concept. For a specific implementation process and technical effect of the communication apparatus, refer to the foregoing method embodiment. Details are not described herein again.

Figure 13:
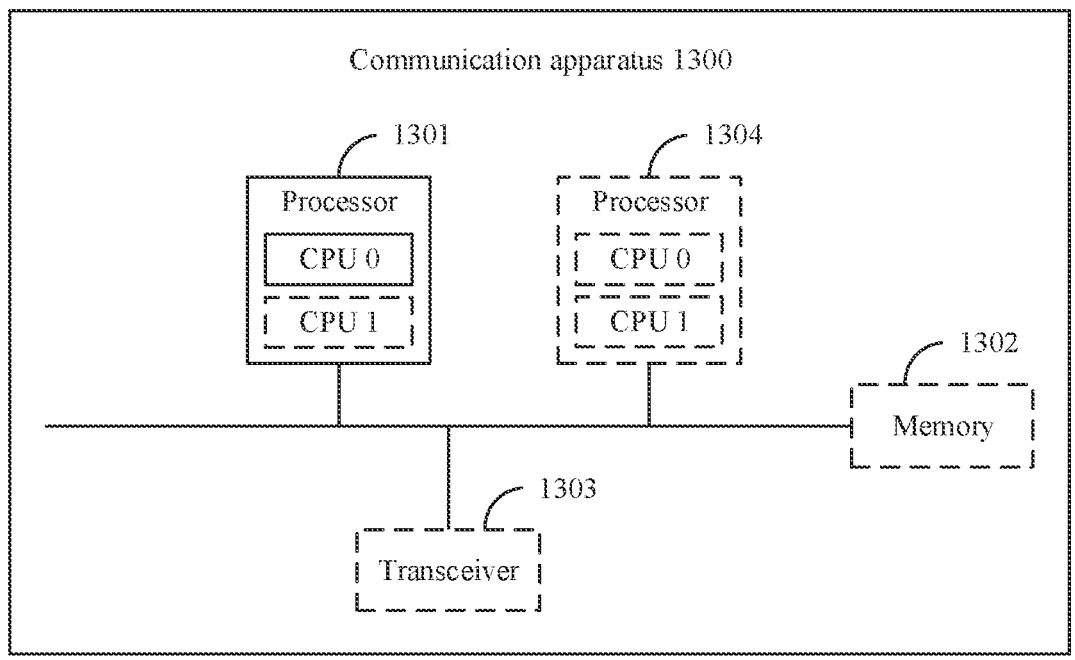
FIG. 13 is a schematic diagram 2 of a structure of a communication apparatus according to an embodiment of this application.

For example, FIG. 13 is a schematic diagram 2 of a structure of a communication apparatus according to an embodiment of this application. The communication apparatus may be a terminal or a network device, or may be a chip (system) or another part or component that may be disposed on the terminal or the network device. As shown in FIG. 13, the communication apparatus 1300 may include a processor 1301. Optionally, the communication apparatus 1300 may further include a memory 1302 and/or a transceiver 1303. The processor 1301 is coupled to the memory 1302 and the transceiver 1303, for example, may be connected by using a communication bus.

The following specifically describes each component of the communication apparatus 1300 with reference to FIG. 13.

The processor 1301 is a control center of the communication apparatus 1300, and may be one processor, or may be a collective name of a plurality of processing elements. For example, the processor 1301 is one or more central processing units (CPUs), or may be an application-specific integrated circuit (ASIC), or is configured as one or more integrated circuits for implementing embodiments of this application, for example, one or more microprocessors (DSPs) or one or more field-programmable gate arrays (FPGAs).

Optionally, the processor 1301 may run or execute a software program stored in the memory 1302, and invoke data stored in the memory 1302, to perform various functions of the communication apparatus 1300.

During specific implementation, in an embodiment, the processor 1301 may include one or more CPUs, for example, a CPU 0 and a CPU 1 shown in FIG. 13.

During specific implementation, in an embodiment, the communication apparatus 1300 may alternatively include a plurality of processors, for example, the processor 1301 and a processor 1304 shown in FIG. 13. Each of these processors may be a single-core processor (single-CPU) or may be a multi-core processor (multi-CPU). The processor herein may be one or more devices, circuits, and/or processing cores configured to process data (for example, computer program instructions).

The memory 1302 is configured to store the software program for performing the solutions in this application, and the processor 1301 controls execution. For a specific implementation, refer to the foregoing method embodiments. Details are not described herein again.

Optionally, the memory 1302 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc (CD) ROM or another compact disc storage, optical disc storage (including a compact disc, a laser disc, an optical disc, a digital versatile disc, a Blu-ray disc, or the like), a magnetic disk storage medium or another magnetic storage device, or any other medium that can be accessed by a computer and that can be configured to carry or store expected program code in an instruction form or in a data structure form, but is not limited thereto. The memory 1302 may be integrated with the processor 1301, or may exist independently, and is coupled to the processor 1301 by using an interface circuit (not shown in FIG. 13) of the communication apparatus 1300.

The transceiver 1303 is configured to communicate with another communication apparatus. For example, the communication apparatus 1300 is a terminal, and the transceiver 1303 may be configured to communicate with a network device, or communicate with another terminal. For another example, the communication apparatus 1300 is a network device, and the transceiver 1303 may be configured to communicate with a terminal, or communicate with another network device.

Optionally, the transceiver 1303 may include a receiver and a transmitter (not separately shown in FIG. 13). The receiver is configured to implement a receiving function, and the transmitter is configured to implement a sending function.

Optionally, the transceiver 1303 may be integrated with the processor 1301, or may exist independently, and is coupled to the processor 1301 by using an interface circuit (not shown in FIG. 13) of the communication apparatus 1300.

It should be noted that, the structure of the communication apparatus 1300 shown in FIG. 13 does not constitute a limitation on the communication apparatus. An actual communication apparatus may include more or fewer components than those shown in the figure, combine some components, or have different component arrangement.

An embodiment of this application further provides a chip system, including a processor. The processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. For example, the memory may be a non-transitory processor, for example, a read-only memory ROM. The memory and the processor may be integrated on a same chip, or may be separately disposed on different chips.

For example, the chip system may be an FPGA, an ASIC, a system on chip (SoC), a CPU, a network processor (NP), a DSP, a micro controller unit (MCU), a programmable controller (PLD), or another integrated chip.

An embodiment of this application provides a communication system. The communication system includes one or more terminals and one or more network devices.

It should be understood that, in embodiments of this application, the processor may be a CPU, or may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

The memory in embodiments of this application may be a volatile memory or a nonvolatile memory, or may include both a volatile memory and a nonvolatile memory. The nonvolatile memory may be a read-only memory, a programmable read-only memory, an erasable programmable read-only memory, an electrically erasable programmable read-only memory, or a flash memory. The volatile memory may be a RAM, and may serve as an external cache. By way of example but not limitative description, many forms of RAMs may be used, for example, a static RAM, a dynamic RAM, a synchronous dynamic RAM, a double data rate synchronous dynamic RAM, an enhanced synchronous dynamic RAM, a synchronous link dynamic RAM, and a direct Rambus RAM.

All or some of the foregoing embodiments may be implemented by using software, hardware (for example, a circuit), firmware, or any combination thereof. When software is used to implement embodiments, the foregoing embodiments may be implemented totally or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), or a semiconductor medium. The semiconductor medium may be a solid-state drive.

The term "and/or" in this specification describes only an association relationship between associated objects and indicates that three relationships may exist. For example, A and/or B may indicate the following three cases: Only A exists, both A and B exist, and only B exists, where A and B may be singular or plural. In addition, the character "/" in this specification generally indicates an "or" relationship between the associated objects, but may also indicate an "and/or" relationship. For details, refer to the foregoing and following descriptions for understanding.

In this application, "at least one" means one or more, and "a plurality of" means two or more. "At least one of the following items (pieces)" or a similar expression thereof means any combination of these items, including any combination of singular items (pieces) or plural items (pieces). For example, at least one item (piece) of a, b, or c may indicate: a, b, c, a-b, a-c, b-c, or a-b-c, where a, b, and c may be singular or plural.

Sequence numbers of the foregoing processes do not mean execution sequences in embodiments of this application. The execution sequences of the processes should be determined based on functions and internal logic of the processes, and should not be constructed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located at one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

What is claimed is:

1. An apparatus comprising:
   a memory configured to store instructions; and
   at least one processor coupled to the memory and configured to:
      receive, from a network device, configuration information indicating N time domain offset information sets that comprise time domain offset information indicating a time domain offset of an uplink control channel relative to a downlink data channel, N time domain location information sets that comprise time domain location information indicating a time domain location of the downlink data channel, and N downlink control information (DCI) formats, wherein each of the N DCI formats corresponds to one of the N time domain offset information sets, wherein each of the N DCI formats corresponds to one of the N time domain location information sets, wherein N is a positive integer and wherein the uplink control channel is used to carry feedback information of the downlink data channel; and
      send, to the network device, a hybrid automatic repeat request-acknowledgement (HARQ-ACK) codebook comprising the feedback information,
   wherein a first quantity of information bits of the HARQ-ACK codebook is related to a first time domain location information set corresponding to first time domain offset information,
   wherein the first time domain offset information is a first element in a first time domain offset information set,
   wherein the first time domain offset information set is a union set of the N time domain offset information sets,
   wherein the first time domain location information set is a union set of M time domain location information sets corresponding to M DCI formats of a first DCI format set,
   wherein each of the M time domain location information sets is one of the N time domain location information sets,
   wherein M is a positive integer less than or equal to N, and
   wherein each DCI format comprised in the first DCI format set is one of the N DCI formats.

2. The apparatus of claim 1, wherein a time domain offset information set corresponding to each DCI format in the first DCI format set comprises the first time domain offset information.

3. The apparatus of claim 1, wherein the at least one processor is further configured to:
determine a second quantity of candidate downlink data channel reception occasions corresponding to the first time domain location information set; and
determine the first quantity based on the second quantity.

4. The apparatus of claim 1, wherein the at least one processor is further configured to:
receive, from the network device, DCI indicating first time domain location information and the first time domain offset information, wherein the first time domain location information is a second element in the first time domain location information set; and
receive, from the network device, the downlink data channel at a time domain location indicated by the first time domain location information.

5. The apparatus of claim 4, wherein a location of the feedback information in an information bit sequence of the HARQ-ACK codebook is based on the first time domain offset information.

6. The apparatus of claim 4, wherein a location of the feedback information in an information bit sequence of the HARQ-ACK codebook is based on the time domain location.

7. The apparatus of claim 1, wherein the downlink data channel is a physical downlink shared channel (PDSCH).

8. The apparatus of claim 1, wherein the uplink control channel is a physical uplink control channel (PUCCH).

9. A method comprising:
sending, to a terminal, configuration information indicating N time domain offset information sets that comprise time domain offset information indicating a time domain offset of an uplink control channel relative to a downlink data channel, N time domain location information sets that comprise time domain location information indicating a time domain location of the downlink data channel, and N downlink control information (DCD) formats, wherein each of the N DCI formats corresponds to one of the N time domain offset information sets, wherein each of the N DCI formats corresponds to one of the N time domain location information sets, wherein N is a positive integer, and wherein the uplink control channel is used to carry feedback information of the downlink data channel; and
receiving, from the terminal, a hybrid automatic repeat request-acknowledgement (HARQ-ACK) codebook comprising the feedback information,
wherein a first quantity of information bits of the HARQ-ACK codebook is related to a first time domain location information set corresponding to first time domain offset information,
wherein the first time domain offset information is a first element in a first time domain offset information set,
wherein the first time domain offset information set is a union set of the N time domain offset information sets,
wherein the first time domain location information set is a union set of M time domain location information sets corresponding to M DCI formats of a first DCI format set,
wherein each of the M time domain location information sets is one of the N time domain location information sets, wherein M is a positive integer less than or equal to N, and
wherein each DCI format comprised in the first DCI format set is one of the N DCI formats.

10. The method of claim 9, wherein a time domain offset information set corresponding to each DCI format in the first DCI format set comprises the first time domain offset information.

11. The method of claim 9, further comprising:
determining a second quantity of candidate downlink data channel reception occasions corresponding to the first time domain location information set; and
determining the first quantity based on the second quantity.

12. The method of claim 9, further comprising:
sending, to the terminal, DCI indicating first time domain location information and the first time domain offset information, wherein the first time domain location information is a second element in the first time domain location information set; and
sending, to the terminal, the downlink data channel at a time domain location indicated by the first time domain location information.

13. The method of claim 12, wherein a location of the feedback information in an information bit sequence of the HARQ-ACK codebook is based on the first time domain offset information.

14. The method of claim 12, wherein a location of the feedback information in an information bit sequence of the HARQ-ACK codebook is based on the time domain location.

15. An apparatus comprising:
a memory configured to store instructions; and
at least one processor coupled to the memory and configured to:
send, to a terminal, configuration information indicating N time domain offset information sets that comprise time domain offset information indicating a time domain offset of an uplink control channel relative to a downlink data channel, N time domain location information sets that comprise time domain location information indicating a time domain location of the downlink data channel, and N downlink control information (DCI) formats, wherein each of the N DCI formats corresponds to one of the N time domain offset information sets, wherein each of the N DCI formats corresponds to one of the N time domain location information sets, wherein N is a positive integer, and wherein the uplink control channel is used to carry feedback information of the downlink data channel; and
receive, from the terminal, a hybrid automatic repeat request-acknowledgement (HARQ-ACK) codebook comprising the feedback information,
wherein a first quantity of information bits of the HARQ-ACK codebook is related to a first time domain location information set corresponding to first time domain offset information,
wherein the first time domain offset information is a first element in a first time domain offset information set,
wherein the first time domain offset information set is a union set of the N time domain offset information sets,
wherein the first time domain location information set is a union set of M time domain location information sets corresponding to M DCI formats of a first DCI format set, wherein each of the M time domain location information sets is one of the N time domain location information sets, wherein M is a positive integer less than or equal to N, and wherein each DCI format comprised in the first DCI format set is one of the N DCI formats.

16. The apparatus of claim 15, wherein a time domain offset information set corresponding to each DCI format in the first DCI format set comprises the first time domain offset information.

17. The apparatus of claim 15, wherein the at least one processor is further configured to:

determine a second quantity of candidate downlink data channel reception occasions corresponding to the first time domain location information set; and determine the first quantity based on the second quantity.

18. The apparatus of claim 15, wherein the at least one processor is configured to:

send, to the terminal, DCI indicating first time domain location information and the first time domain offset information, wherein the first time domain location information is a second element in the first time domain location information set; and send, to the terminal, the downlink data channel at a time domain location indicated by the first time domain location information.

19. The apparatus of claim 18, wherein a location of the feedback information in an information bit sequence of the HARQ-ACK codebook is based on the first time domain offset information.

20. The apparatus of claim 18, wherein a location of the feedback information in an information bit sequence of the HARQ-ACK codebook is based on the time domain location.

* * * * *